(12) United States Patent
Patel

(10) Patent No.: US 11,517,813 B2
(45) Date of Patent: Dec. 6, 2022

(54) HYBRID LENS FOR HEAD MOUNT DISPLAY

(71) Applicant: Hyper Reality Partners, LLC, Kansas City, MO (US)

(72) Inventor: Sajid Patel, Arlington Heights, IL (US)

(73) Assignee: Hyper Reality Partners, LLC, Kansas City, MO (US)

( * ) Notice: Subject to any disclaimer, the term of this patent is extended or adjusted under 35 U.S.C. 154(b) by 0 days.

(21) Appl. No.: 15/430,949

(22) Filed: Feb. 13, 2017

(65) Prior Publication Data

US 2017/0232336 A1 Aug. 17, 2017

Related U.S. Application Data

(60) Provisional application No. 62/294,893, filed on Feb. 12, 2016.

(51) Int. Cl.
| | |
|---|---|
| *A63F 13/00* | (2014.01) |
| *A63F 13/25* | (2014.01) |
| *G02B 3/08* | (2006.01) |
| *H04N 13/344* | (2018.01) |
| *G02B 27/01* | (2006.01) |
| *A63F 13/5255* | (2014.01) |
| *A63F 13/212* | (2014.01) |
| *A63F 13/211* | (2014.01) |

(52) U.S. Cl.
CPC ............ *A63F 13/25* (2014.09); *A63F 13/211* (2014.09); *A63F 13/212* (2014.09); *A63F 13/5255* (2014.09); *G02B 3/08* (2013.01); *G02B 27/0172* (2013.01); *H04N 13/344* (2018.05); *A63F 2300/8082* (2013.01); *G02B 2027/0123* (2013.01); *H04N 2213/001* (2013.01)

(58) Field of Classification Search
CPC ....... A63F 13/25; A63F 13/211; A63F 13/212
See application file for complete search history.

(56) References Cited

U.S. PATENT DOCUMENTS

| | | | |
|---|---|---|---|
| 2008/0106489 A1* | 5/2008 | Brown ............... | G02B 27/0172 345/9 |
| 2015/0234168 A1* | 8/2015 | Bumgardner ........ | G02B 25/001 349/113 |

* cited by examiner

*Primary Examiner* — David L Lewis
*Assistant Examiner* — Eric M Thomas
(74) *Attorney, Agent, or Firm* — Erise IP, P.A.

(57) ABSTRACT

A lens assembly, related methods and constituent optical elements are described. The assembly may be used to direct and focus light for various applications. In one instance, the lens assembly is used in conjunction with one or more sources of light such as projected images or video as part of a virtual reality system. The lens assembly includes two or more optical elements arranged to receive light or direct light through different spatial regions of the assembly at different focal powers corresponding to a first user viewing zone and a second user viewing zone. In one instance, the first user viewing zone is a peripheral viewing zone and the second viewing zone is a primary or non-peripheral viewing zone (or vice versa).

20 Claims, 41 Drawing Sheets

Section A

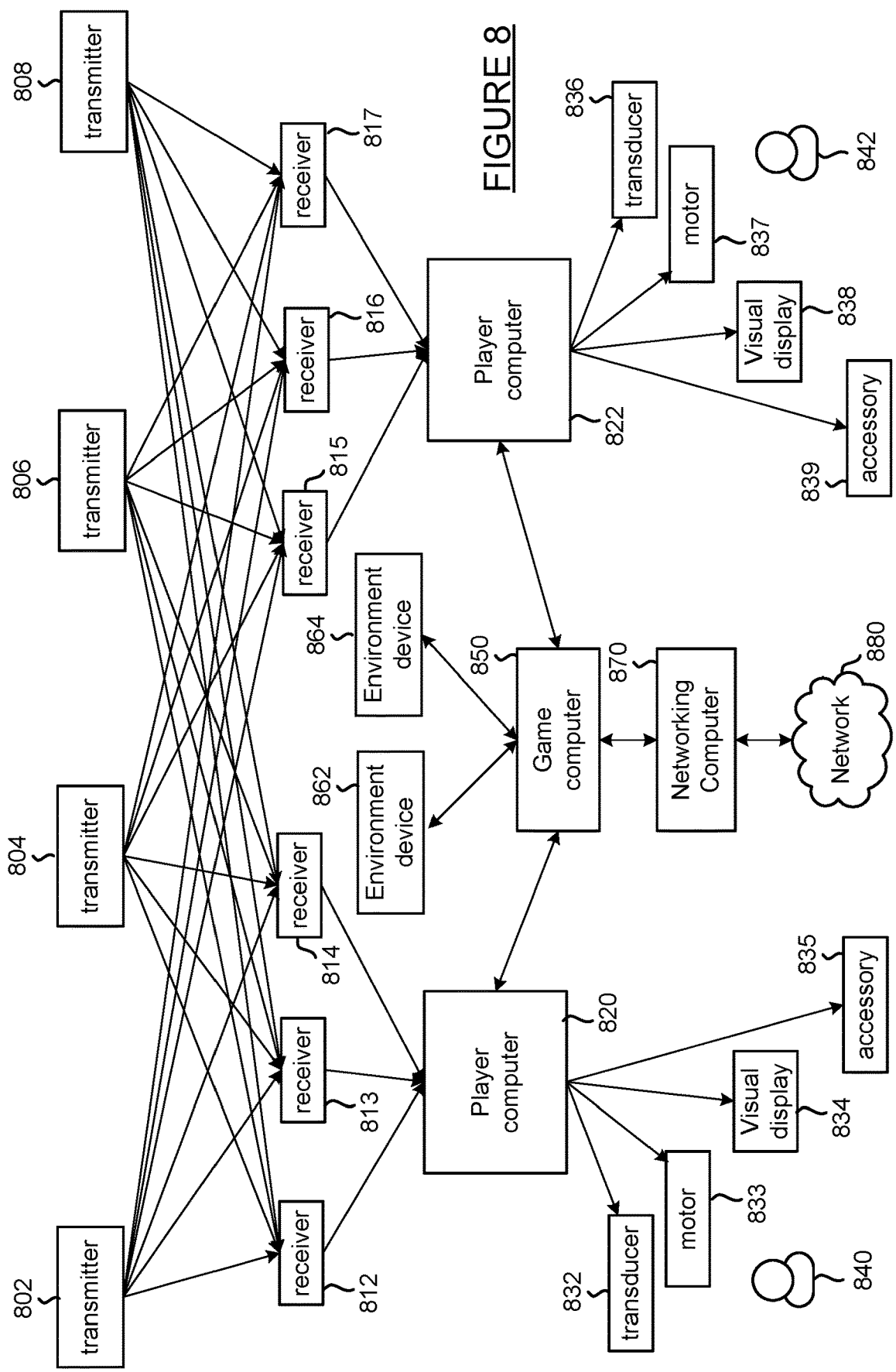

HYBRID LENS FOR HEAD MOUNT DISPLAY

CROSS-REFERENCE TO RELATED APPLICATIONS

This application claims the priority benefit of U.S. Provisional Application Ser. No. 62/294,893, titled "Hybrid Lens for Head Mount Display," filed Feb. 12, 2016, the disclosures of which is incorporated herein by reference.

SUMMARY

A lens assembly may be used to direct and focus light for various educational, research, and entertainment applications. In one instance, the lens assembly is used in conjunction with one or more sources of light such as projected images, light pulses, stereoscopic content, video or other content or data as part of a virtual reality system. The lens assembly includes two or more optical elements arranged to receive light or direct light through different spatial regions of the assembly at different focal powers.

The lens assembly can be used with a headset or other support structure to position the lens assembly relative to an eye of an end user. The lens assembly can be oriented relative to a curved display screen or panel. The curvature of the screen or panel can be constant such as a constant radius or have another curvature such as ellipsoidal, parabolic or other curved profiles. The curved profiles do not need to be conic sections. The curved profile can be variable with a tapering curve in the peripheral viewing zone. In some instances, the hybrid lens and screen may be flat.

In one instance, a given optical element has a focusing power that is determined by the curvature of the surface of the element. For example, the focal power of Fresnel element is determined by a groove feature and an associated groove profile with a groove shape and a groove depth. The groove includes various shapes which typically include one or more curved portions in some instances. In one instance, the lens assembly includes optical elements to distribute the focal power across the surface of the assembly or one or more components thereof and refers to one implementation having a curvature that determines focal power directed towards the element's center. In one instance, one or more Fresnel structures determine a focal power toward the edge and between these two regions there is a transition.

Instances of the invention include adjacent, or other optical elements in communication with each other suitable for defining a field of view with differing focal powers. Aspheric regions and Fresnel regions are arranged relative to each by the position of optical elements to improve a user's field of view experience.

The different regions of the lens assembly can direct light to user viewable regions or sections of a field of view corresponding to a first user viewing zone and a second user viewing zone. In one instance, the first user viewing zone is a peripheral viewing zone and the second viewing zone is a primary or non-peripheral viewing zone (or vice versa). Thus, in a game, although peripheral vision and information may enhance the realism of an experience, that visual information can be less detailed than information positioned in a central or primary portion of a user's field of view.

In one instance, and without limiting or excluding other uses and definitions, a lens is one or more beam directing or focusing elements. A lens or lens assembly can include one or a combination of such optical elements. In one instance, the optical elements are glass, plastic, or other suitable light transmitting material.

In one instance, a lens or optical assembly for a viewing device such as a virtual reality headset or other device includes one or more Fresnel optical elements. Each element can be a different shaped solid or region of a surface or object and can be a different material such as plastic, glass and other optically suitable materials. Grooves having various depths, shapes, and geometries can be formed in, on, or of the material used to form a lens or optical element. The arrangement of these materials and components can be implemented as described herein.

BRIEF DESCRIPTION OF THE DRAWINGS

FIG. 8 is a block diagram of a virtual reality system for use with a headset

DETAILED DESCRIPTION

Figure 1A:
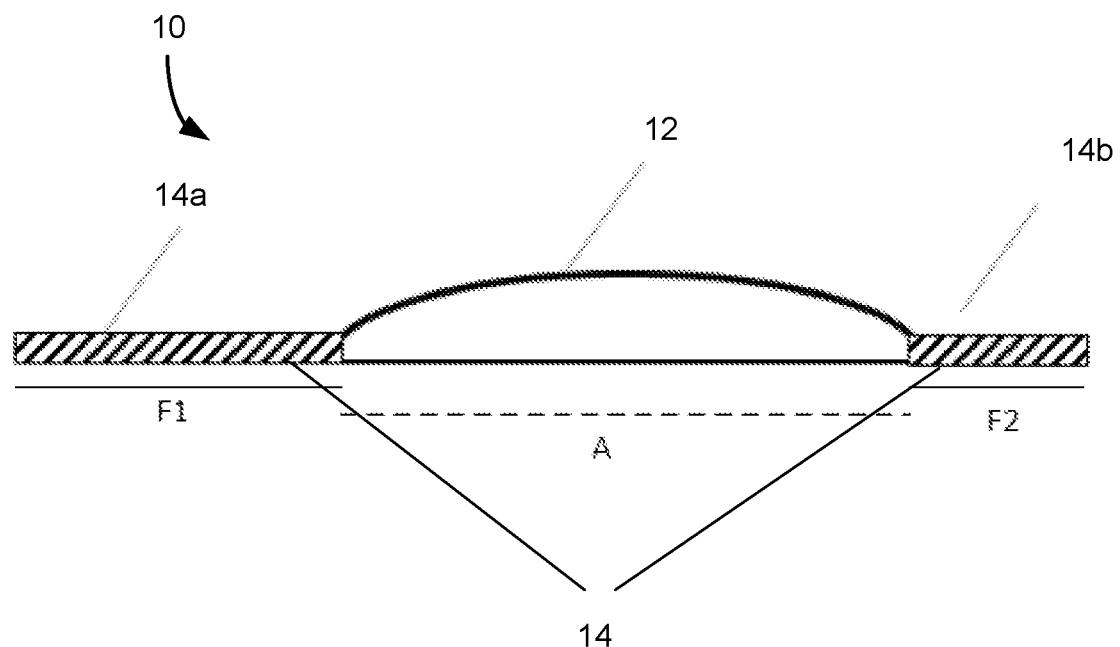
FIG. 1A depicts an example of a hybrid lens shown in a cross-sectional view in accordance with the disclosure.
Figure 1B:
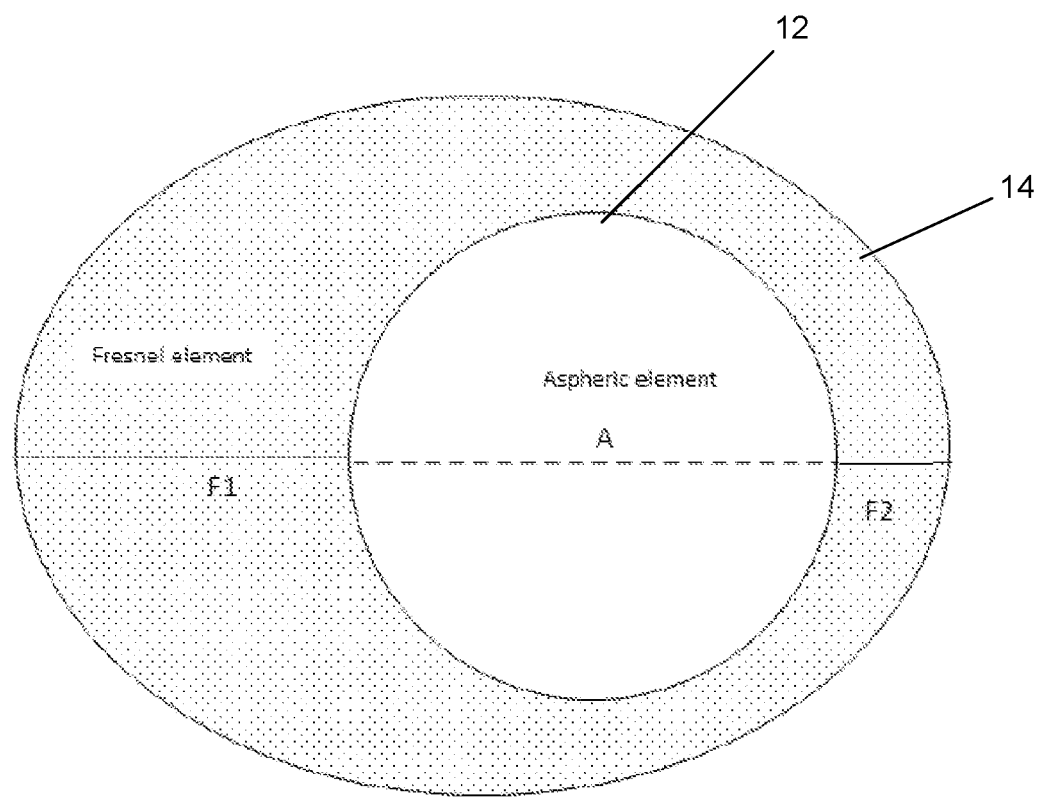
FIG. 1B depicts an example of a hybrid lens shown in a top view in accordance with the disclosure.

The present technology relates to an optical system or assembly that includes a first optical element and a second optical element arranged relative to each other such as in an annular, adjacent or other configuration. An example of such a lens assembly 10 is shown in FIGS. 1A and 1B. In one instance, the first optical element is an aspheric optical element 12 and the second element is a Fresnel optical element 14 as shown. The reference to first and second elements can be reversed without limiting the scope of the invention. The optical system or assembly of the disclosure can also be referred to as a hybrid lens system as a result of different regions of the system corresponding to a combination of the first and second optical elements.

In one instance, the Fresnel optical element 14 is used to provide suitable focal power to provide higher performance in areas where the user gazes most often and Fresnel structures at peripheral angles where the user does not gaze directly or use as often. In some instances, the aspheric optical element 12 is used to provide suitable focal power to provide higher performance in areas where the user gazes most often and the Fresnel structures As shown in FIGS. 1A and 1B, a hybrid structure is composed of an aspheric refractive portion surrounded by a Fresnel portion. The aspheric portion forms the central portion of the optical element and Fresnel structure forms the peripheral portion of the optic. The arrangement, geometry, size and groove properties can be adjusted in different instances, as is discussed in more detail below. In the cross-sectional view of FIG. 1A, the length of a first Fresnel element 14a is F1 and the length of a second Fresnel element 14b is F2. The length of the aspheric optical element 12 is A. According to the design of FIGS. 1A and 1B, A is greater than or equal to F1 and F1 is greater than or equal to F2. In some instances, the size of the radii in FIG. 1A may vary, and are not constrained relative to each other. They radii may have a different relationship with respect to each other than that shown in FIGS. 1A and 1B. For example, F1 and F2 may be larger than A, or F1 and F2 could be smaller than A In the view of FIG. 1B, the Fresnel optical element appears as an elliptical or egg shaped region with the aspheric optical element adjacent to, disposed thereon, or otherwise continuous with the Fresnel element to constitute a lens assembly with different regions and surfaces. The aspheric element 12 can be elliptical, circular or other smooth or rectilinear curves or shapes. This lens assembly 10 can be viewed as a hybrid of a Fresnel and aspheric elements. The hybrid optical element or assembly can be described as a Fresnel optical element where the groove depth profile (GDP) can remain constant or changes from a first groove depth value in one or more areas of the optical element such as in a central area to a second groove depth value toward the periphery of the optical element. In one instance, the second groove depth value is less than the first groove depth value. In some instances, the structure of the Fresnel groove can be that of 1) constant groove width, 2) constant groove depth, or 3) a variation of these In some instances, the groove width can also be a parameter that determines Fresnel groove structure.

Figure 2A:
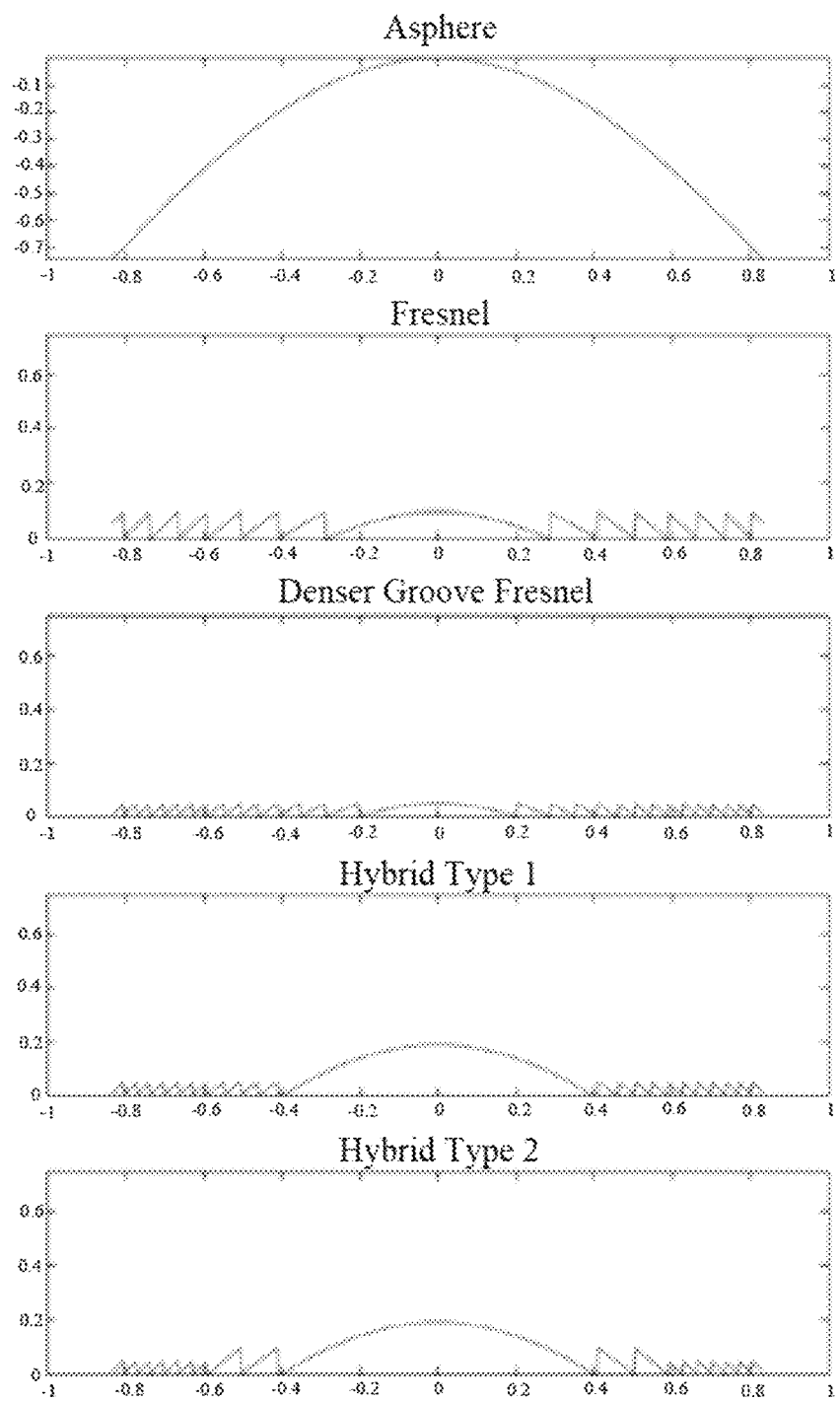
FIG. 2A depicts five exemplary lens assemblies from aspheric to hybrid type according to an instance of the disclosure.
Figure 2B:
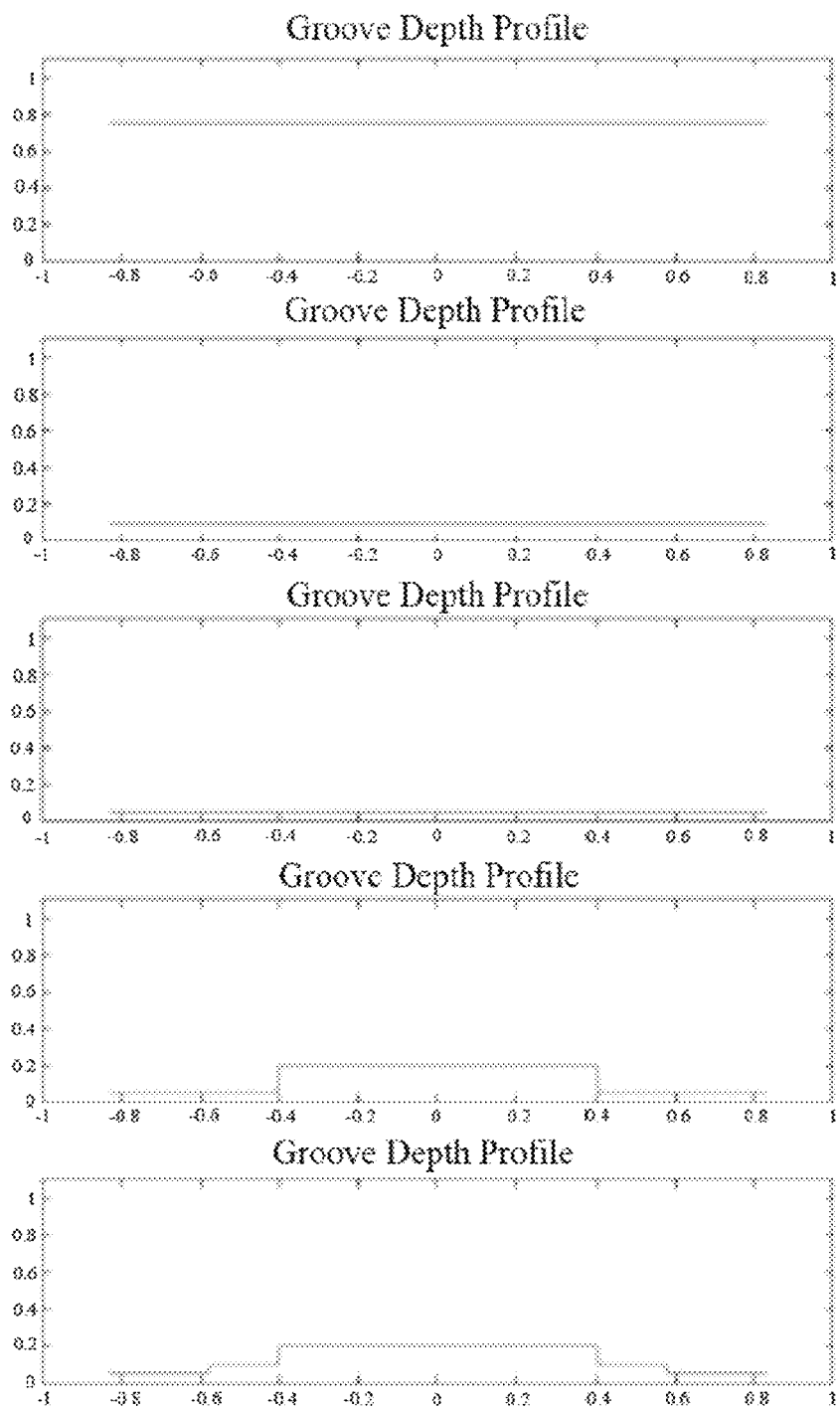
FIG. 2B depicts the five exemplary groove depth profiles (GDPs) for the lens assemblies from aspheric to hybrid type 2 of FIG. 2A according to an instance of the disclosure.

In one instance, the hybrid device or assembly has a step function GPD as shown in the GPD profiles of FIGS. 2A and 2B. In FIG. 2A, the top left lens element is an asphere (non-hybrid), below that is a Fresnel lens element (non-hybrid), and a denser groove Fresnel lens element follows next. The bottom two lens designs on the left side are labeled hybrid type 1 and hybrid type 2 and correspond to the lens assembly layout of FIGS. 1A and 1B. The central aspheric element is bounded by a Fresnel element or a first and a second Fresnel element of lengths F1 and F2 depending on how the geometry is specified. The groove depth profiles differ for type 1 and type 2. On the right side of FIG. 2B, the various groove profiles are shown.

The GPD can be composed of multiple steps or can vary continuously across the optic element. Further, there can be one optical element or multiple elements stacked in a system. The focal power of each element does not have to match that of other elements. In multiple optics system, the focal power can vary across each element. The variation can be synchronized across elements.

The optical elements can be curved with a varying or constant radius. The optical element can be constructed as one piece or multiple pieces; for example, a circular region surrounded by annular rings. Optical elements can have both surface focal power and Fresnel focal power. They can be single sided or dual sided where opposing surfaces do not necessarily match. The elements of the asphere and Fresnel elements of the lens assembly can be composed of different materials (index of refraction) to control chromatic aberrations (achromats). Optical elements can include annular parts in order to split optical power from one to more than one surface. The optical element may be fabricated using one or more fabrication techniques and/or an element may be assembled from one or more parts.

Though several examples of a curved hybrid, multi-radius lens are discussed for use with a curved display, e.g. a varying curved display, the lens and display may have other implementations as well. For example, the lens and display may have a single curve or, in some instances, be flat without any curve. When flat, the lens may still be implemented as a hybrid lens, either as one piece or two piece (e.g., having an asphere portion with a Fresnel element or portion next to the aspheric portion). The flat hybrid lens can be used with a flat display, for example a display having two flat screens—one for each eye of a user. Additionally, a curved display may be used with a flat lens, and a flat display may be used with a curved lens. The different combination of flat/curved lens and flat/curved display may be used within a headset, in a like manner as a curved headset, as discussed herein.

Various groove structures are within the scope of the disclosure. In one instance, the groove structures are aligned element to element. The alignment allows for a smooth viewing transition as a user looks through the different Fresnel elements. For instance, when the user looks through the hybrid lens, all graphical details of the display that have continuity looking directly at the display still have continuity looking through the hybrid lens even though the image may now be distorted.

In some instances, the image on the display may be distorted in a certain way, so that when viewed through the hybrid lens which generally distorts the image, the image appears undistorted like the original image viewed directly without a lens.

A hybrid or combination lens can be used to provide a large field of view for a variety of applications. For example, a large field of view is needed for use in virtual reality applications to enhance the user experience. In FIGS. 3A-3K, various views of a viewing device that includes one or more hybrid lens assemblies are shown. The field of view is based on a variety of factors, including the diameter of the optical element and the distance the optical element is placed from the eye.

For example, an optical element is typically 10-15 mm from the eye to accommodate the eyelashes or glasses of a user. In part, because it is desirable to have the optical elements as close to the eye as possible, in part the disclosure relates to lens assemblies that increase the field of view, which is a function of the lens diameter and the distance from the lens to the eye. The lens assembly can also be placed various distances from the display of the viewing device. For example, the assembly can be positioned such that the back focal distance between the assembly and the display, such as a curved display, is typically 25-35 mm.

In one instance, a headset 30 is provided for use with a virtual reality system that includes a housing 31 for holding first and second lenses 32, 34, as illustrated in FIGS. 3A-3K. The headset has first and second lateral sides 36, 38 such that the first lateral side 36 is located on a first side of the head of a user and the second lateral side 38 is located on a second side of the head of the user. Thus, the first and second lenses 32, 34 are positioned in the headset 30 such that each first lens 32 is in the first lateral side 36 of the headset 30 and the second lens 34 is in the second lateral side 38 of the headset 30. This arrangement allows the first and second lenses to be positioned substantially over each eye of the user on the first and second sides of the head of the user.

The first and second lateral sides 36, 38 of the headset 30 can also include additional features such as components for delivering audio to the user. For example, the first and second lateral sides 36, 38 of the headset 30 can include first and second headphones 40, 42 such that each headphone 40, 42 is positioned on the first and second sides of the head of the user for delivering sound associated with the virtual reality environment to the user.

In one instance, each of the first and second lenses 32, 34 of the headset 30 includes, connects to, is defined by or is formed from first and second lens portions. The first lens portion is in the form of an aspheric lens. The second lens portion is in the form of a Fresnel lens. The combination of types of lenses is used to create a relatively thinner and flatter lens with an improved field of view FIGS. 3L-U illustrate another instance of a headset 30 provided for use with a virtual reality system that includes a housing 31 for holding first and second lenses 32, 34. Similar to the headset of FIGS. 3A-3K, the headset of FIGS. 3L-U has first and second lateral sides 36, 38 such that the first lateral side 36 is located on a first side of the head of a user and the second lateral side 38 is located on a second side of the head of the user. Thus, the first and second lenses 32, 34 are positioned in the headset 30 such that each first lens 32 is in the first lateral side 36 of the headset 30 and the second lens 34 is in the second lateral side 38 of the headset 30. This arrangement allows the first and second lenses to be positioned substantially over each eye of the user on the first and second sides of the head of the user.

The first and second lateral sides 36, 38 of the headset 30 can also include additional features such as components for delivering audio to the user. For example, the first and second lateral sides 36, 38 of the headset 30 can include first and second headphones 40, 42 such that each headphone 40, 42 is positioned on the first and second sides of the head of the user for delivering sound associated with the virtual reality environment to the user.

Figure 4:
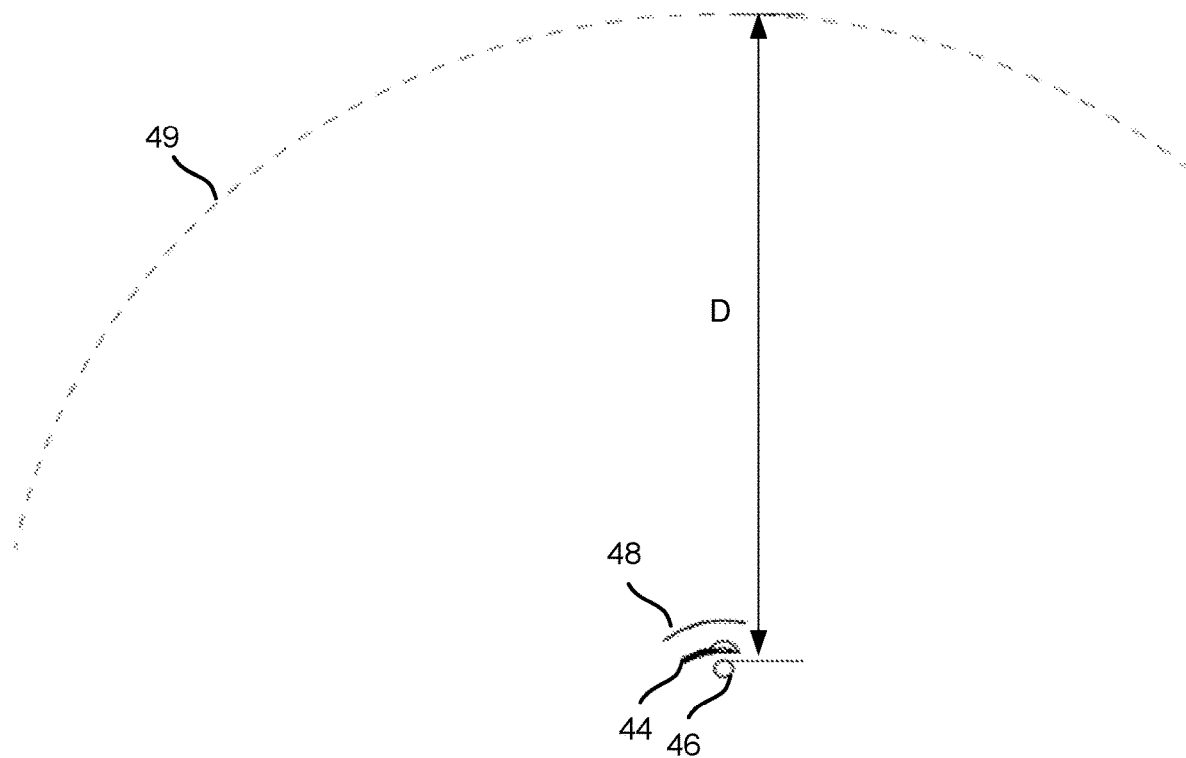
FIG. 4 is a schematic representation of a hybrid lens assembly in a viewing device for use with a virtual reality system according to instances of the disclosure.
Figure 5A:
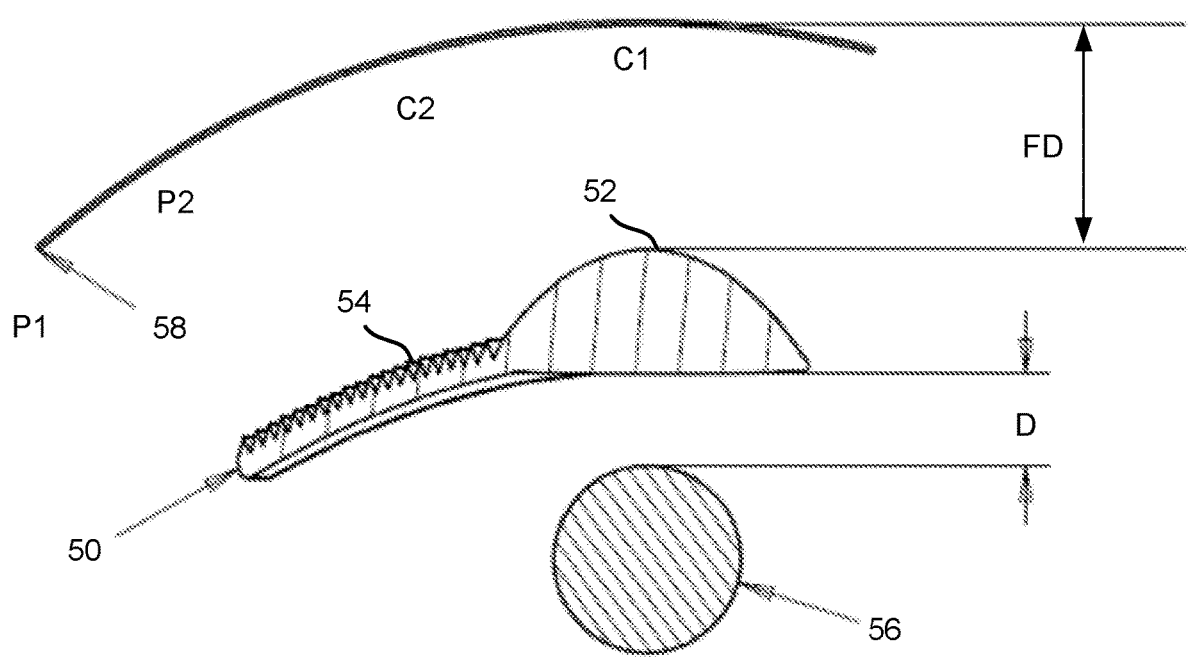
FIGS. 5A-5G are schematic representations of a portion of a viewing device that includes one or more hybrid lens assemblies shown relative to an eye of a user and a content source display according to instances of the disclosure.
Figure 5B:
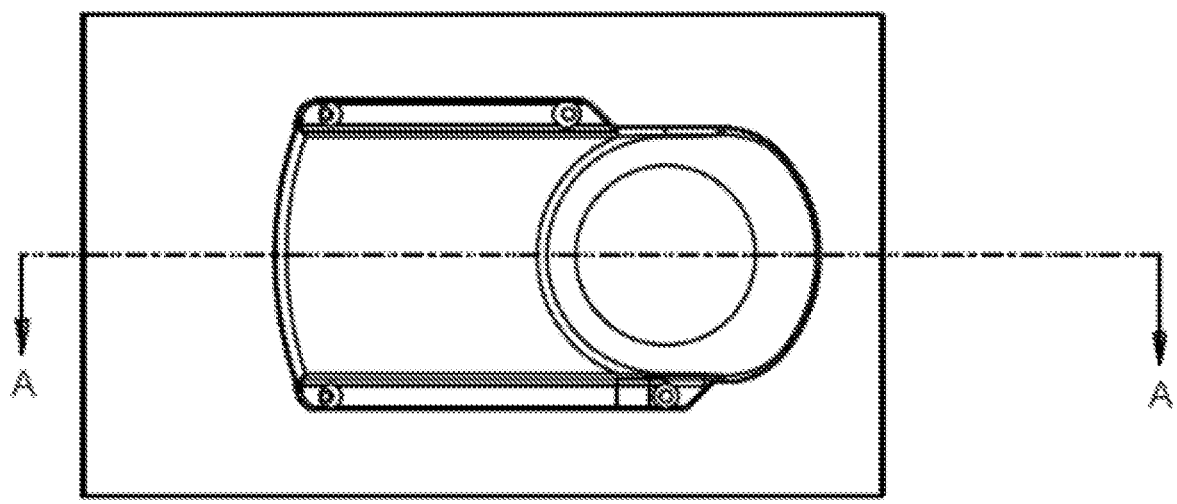
Figure 5C:
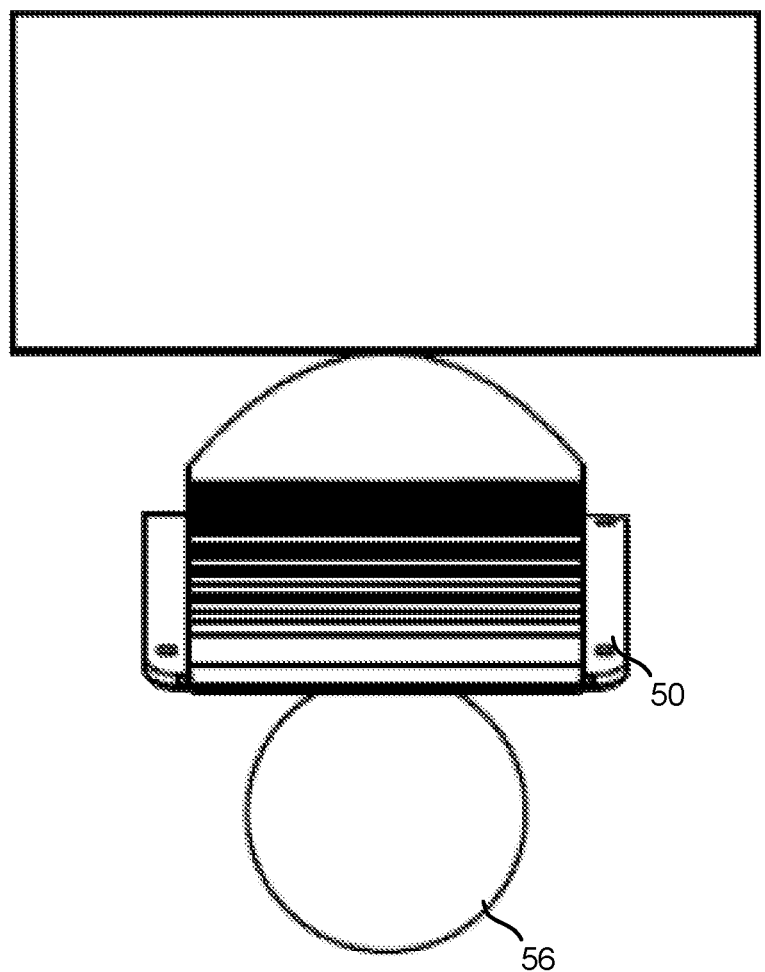
Figure 5D:
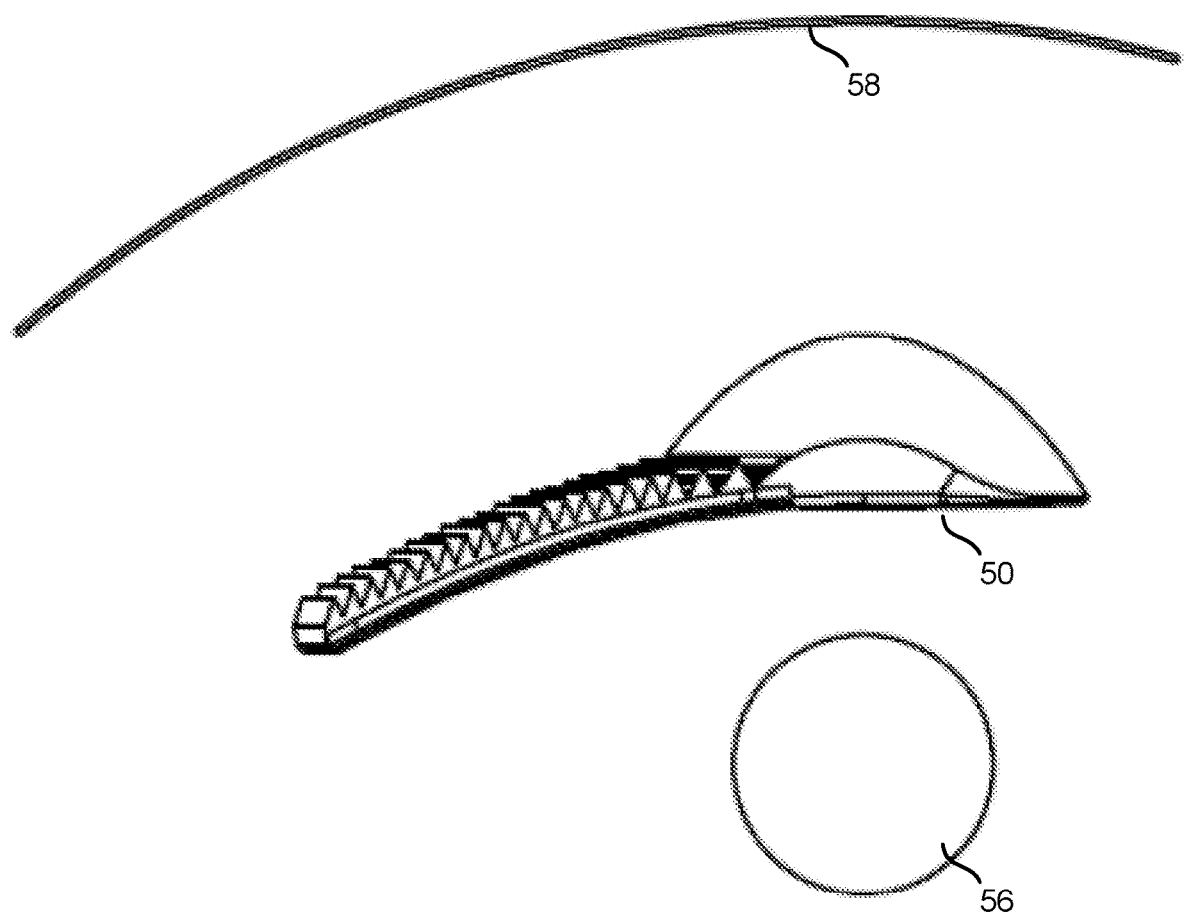
Figure 5E:
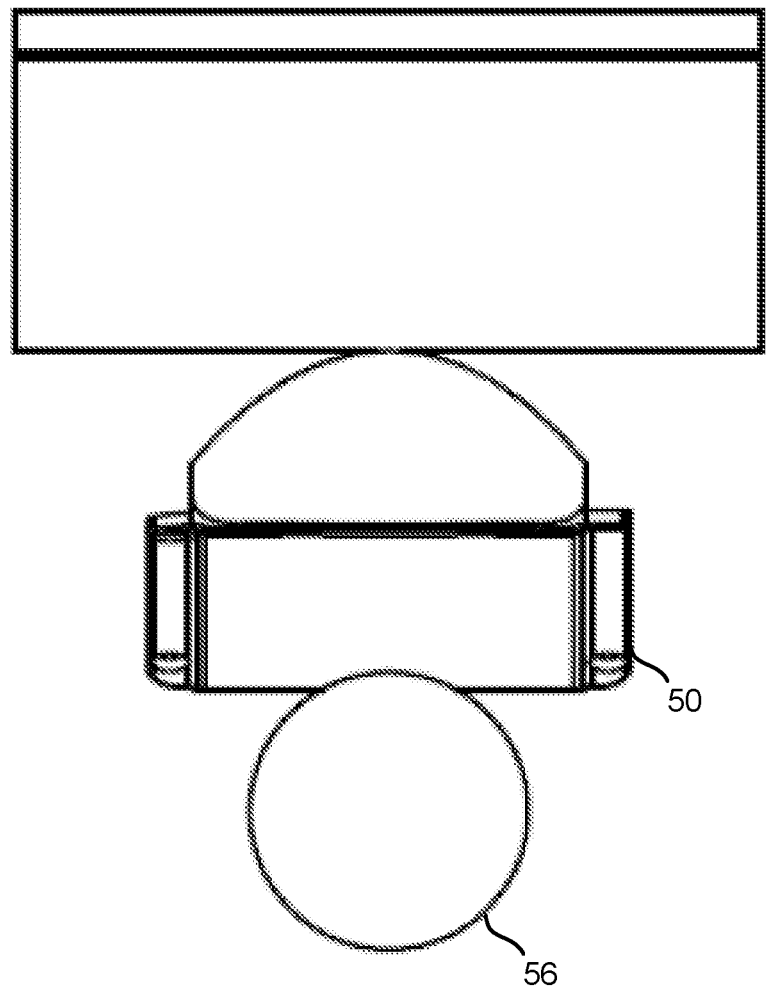
Figure 5F:
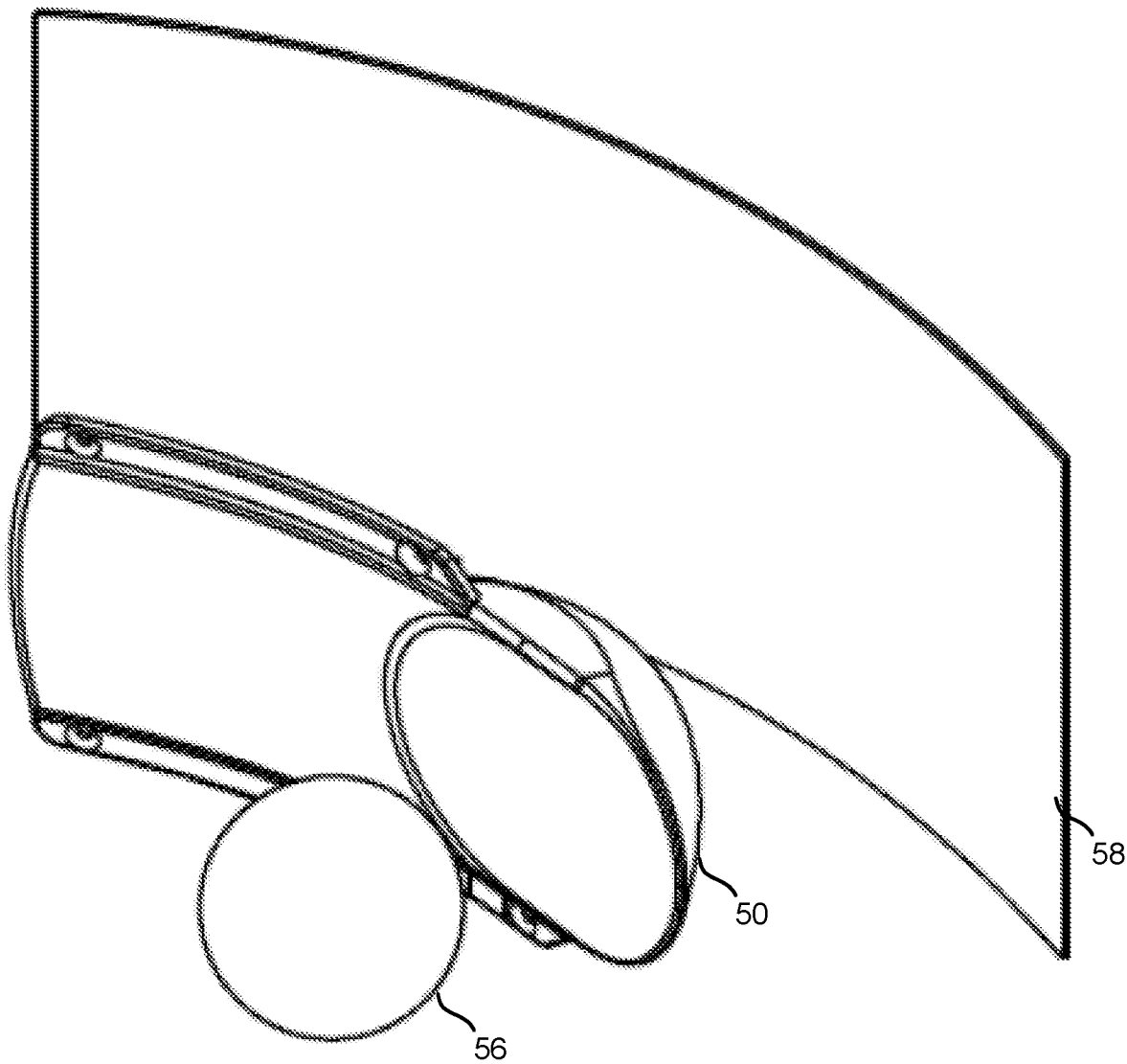
Figure 5G:
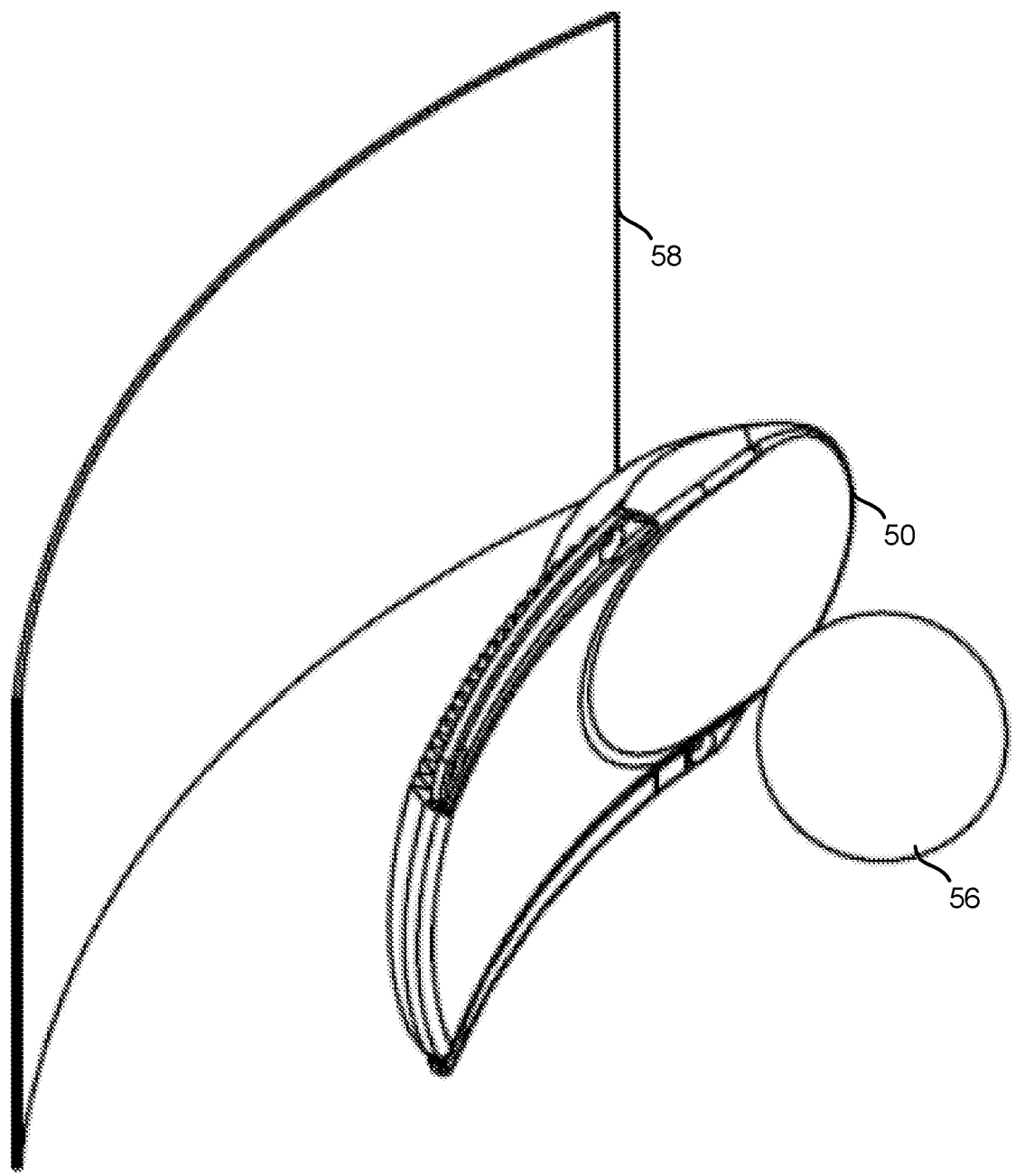

In one instance, each of the first and second lenses 32, 34 of the headset 30 includes, connects to, is defined by or is formed from first and second lens portions. The first lens portion is in the form of an aspheric lens. The second lens portion is in the form of a Fresnel lens. The combination of types of lenses is used to create a relatively thinner and flatter lens with an improved field of view FIG. 4 illustrates a portion of a headset including a lens assembly 44 as disclosed herein used in a virtual reality system relative to a virtual image 49 that is formed by the lens assembly 44. The virtual image 49 that is formed by the lens assembly 44 viewing a display 48 of the headset is located a certain distance from the user and the headset. The virtual image 49 can be in a dark focus distance range from an eye 46 of the user such that the focus muscles of the eye are relaxed. For example, the distance D between the virtual image 49 and the eye 48 of the user can be approximately 2 meters. In some instances, the virtual image can be closer or further from the user's dark focus FIGS. 5A-5G illustrate an exemplary instance of one of a first and second lens positioned within a headset for use with a virtual reality system relative to an eye of a user and a display of the headset. The lens assembly 50 is formed from first and second lens portions 52, 54 with the first lens portion 52 being in the form of an aspheric lens and the second lens portion 54 being in the form of a Fresnel lens. An eye 56 of a user of the headset is positioned a distance D from the lens assembly 50, for example, in the range of 10-15 mm between the eye 56 and the lens assembly 50. A display 56 can be a curved with a constant curvature. The display can be positioned a distance from the lens assembly 50. For example, the assembly can be positioned such that the back focal distance FD between the assembly and the display can be 25-35 mm. FIGS. 5C-5E illustrate a left, top and right side view of a particular lens assembly 50, a user's eye 56, and display 58. FIGS. 5F-G provide perspective views of left lens assembly, display and user's left eye.

Returning to FIG. 5A, the field of view of the viewing device and that of the user of the device is shown relative to a left eye version of a hybrid lens. A curved viewing screen or panel 58 is shown. This screen 58 can have a constant radius or have a variable curvature. P1 shows a peripheral viewing region. As the region behind P1 is outside of the viewing area, it denotes the peripheral viewing zone boundary. P2 is also in the peripheral viewing zone but represents a progression that is closer to the central viewing zone C1. C2 is a viewing zone in between P2 and C1. C1 is wherein a first level of focal power is advantageous, wherein the first level of focal power is greater than other second or third or fourth levels of focal power such at P2 or P1. These lower levels of focal power can be controlled by the groove pattern and positioning of the Fresnel component and correspond to viewing zones P1, P2 and zones in between P2 and C2. With C1 having a power closer to that of C1 and P1 having the lowest focal power.

FIGS. 5H-O illustrate another exemplary instance of one of a first and second lens positioned within a headset for use with a virtual reality system relative to an eye of a user and a display of the headset. The lens assembly 50 is formed from first and second lens portions 52, 54 with the first lens portion 52 being in the form of an aspheric lens and the second lens portion 54 being in the form of a Fresnel lens. An eye 56 of a user of the headset is positioned a distance D from the lens assembly 50, for example, in the range of 10-15 mm between the eye 56 and the lens assembly 50. In some instances, the distance may be about 12.5 millimeters.

Figure 5H:
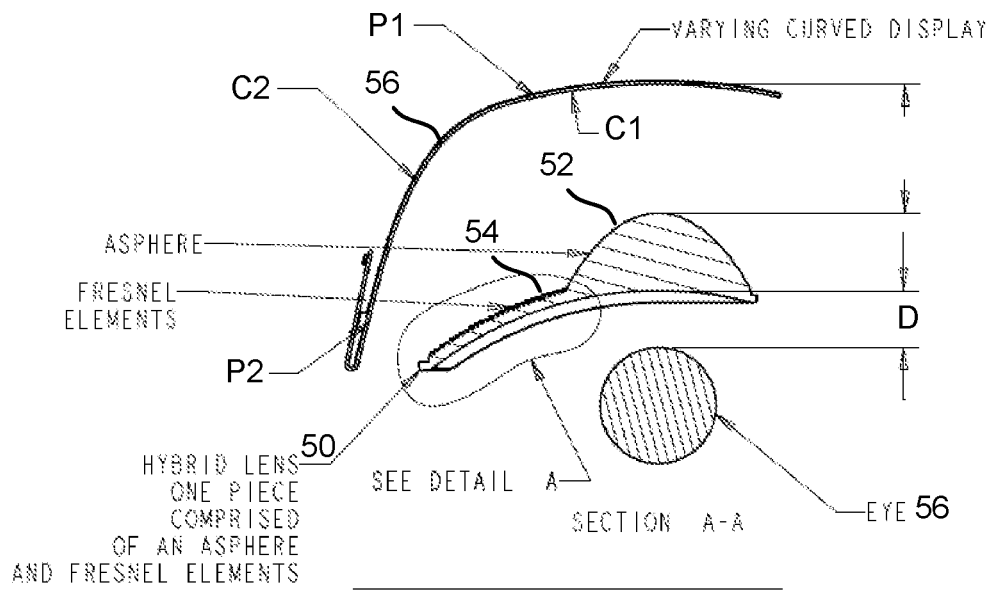
FIGS. 5H-5O are schematic representations of a portion of another viewing device that includes one or more hybrid lens assemblies shown relative to an eye of a user and a content source display according to instances of the disclosure.
Figure 5I:
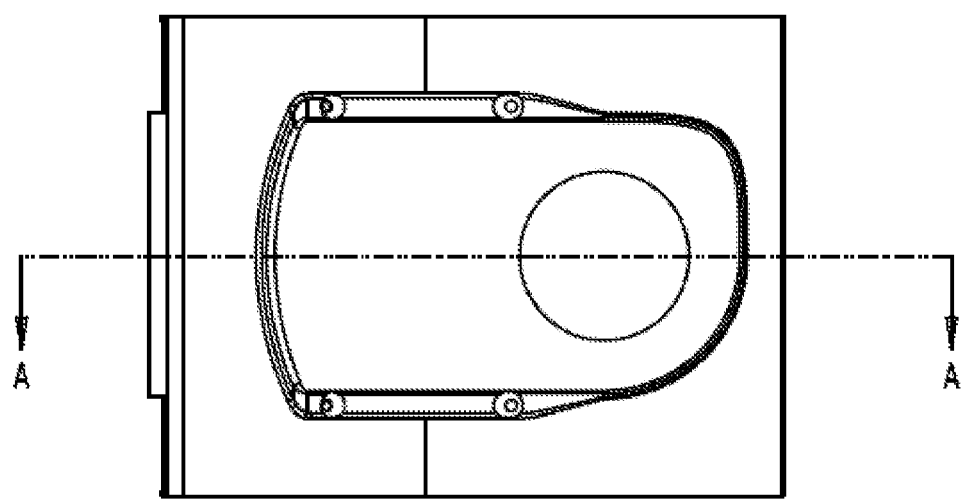

A display 56 of FIG. 5H can be curved with a variable curvature. Display 56 may include a first curvature C1 on a first portion of the display, such as for example a portion of the display in front of the eye and extending from an end towards the center of the headset. The constant curvature may have a value of between 124-128 millimeters. In some instances, the constant curvature may be about 126.3 millimeters. From a point P1 on the display towards the outer end of the display to point P2, the curvature of the display may vary. In some instances, the curvature from point P1 to point P2 may have a radius of curvature ranging from 25-5645 millimeters. Thus, a portion of the variable curved portion of the display may be noticeable more curved than other portions. For example, from point P1 to point P2, the variable curvature portion may begin with a curvature of 126.3 millimeters at point P1, end with a curvature of 5645 millimeters at point P2, and vary between the two points, including at one point have a curvature of about 25 millimeters.

The display is positioned a distance D from the lens assembly 50. For example, the assembly can be positioned such that the back focal distance FD between the assembly and the display can be 25-35 mm. The lens assembly may be placed a distance from the user's eye. In some instances, the lens assembly may be between 10-15 millimeters from the user's eye. In some instances, the lens assembly is about 12.5 millimeters from the user's eye.

Though several examples of a curved hybrid, multi-radius lens are discussed for use with a curved display, e.g. a varying curved display, the lens and display may have other implementations as well. For example, the lens and display may have a single curve or, in some instances, be flat without any curve. When flat, the lens may still be implemented as a hybrid lens, either as one piece or two piece (e.g., having an asphere portion with a Fresnel element or portion next to the asphere portion). The flat hybrid lens can be used with a flat display, for example a display having two flat screens—one for each eye of a user. The flat lens and display may be used within a headset, in a like manner as a curved headset, as discussed herein.

Figure 5J:
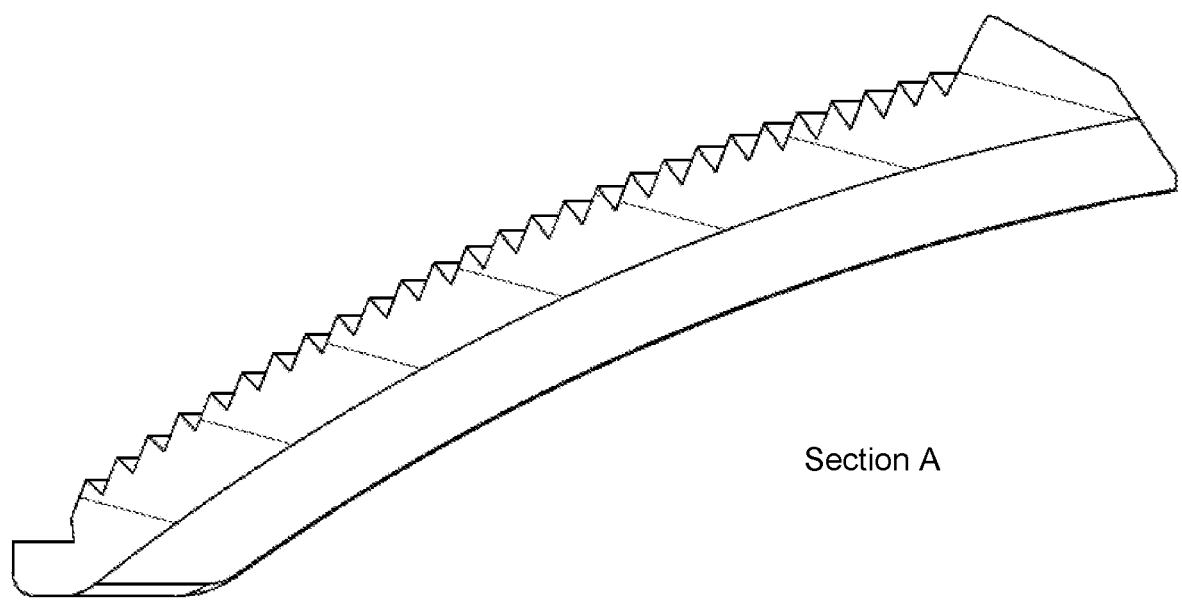

FIG. 5J illustrates a Fresnel lens element. As illustrated in FIG. 5J, the Fresnel elements are positioned adjacent to each other and the lens as a whole is slightly curved.

Figure 5K:
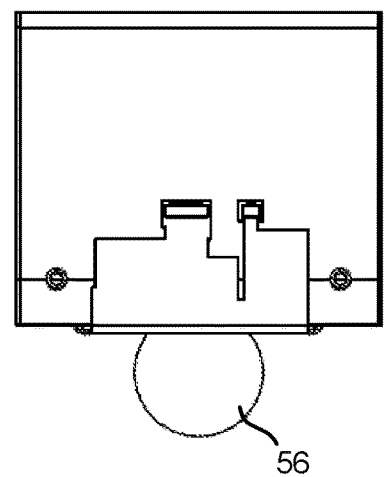
Figure 5L:
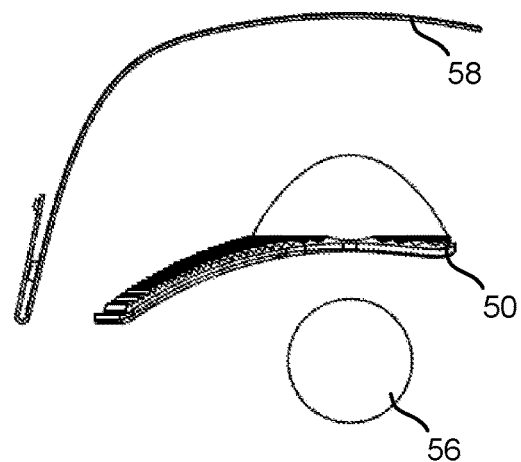
Figure 5M:
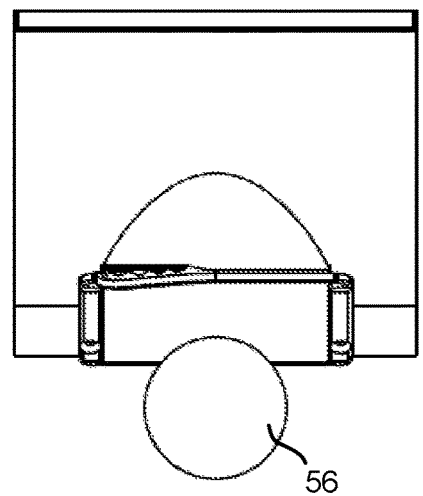
Figure 5N:
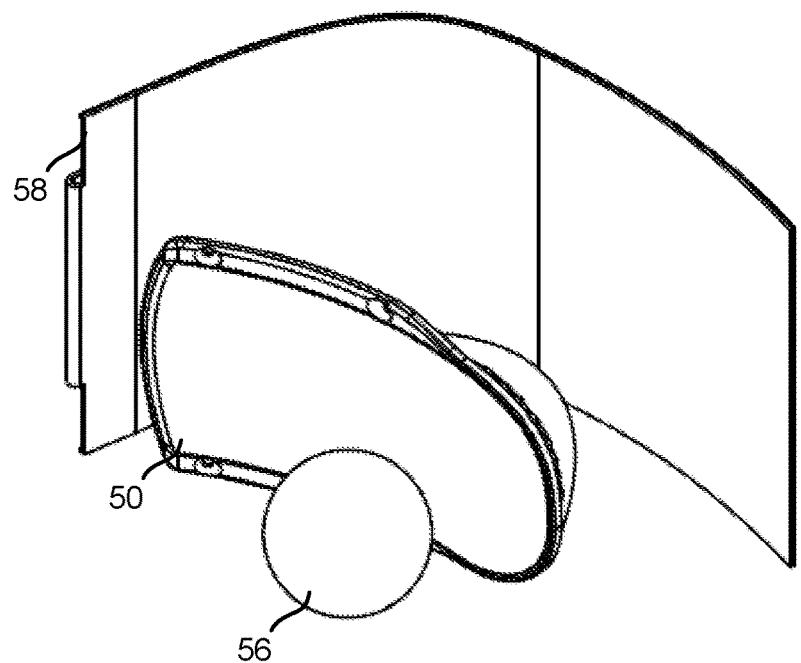
Figure 5O:
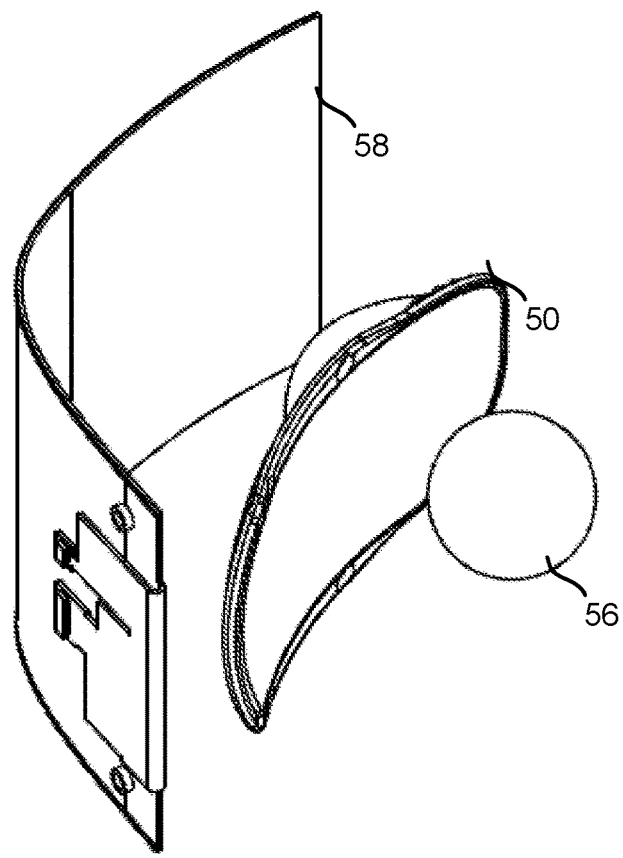
Figure 6A:
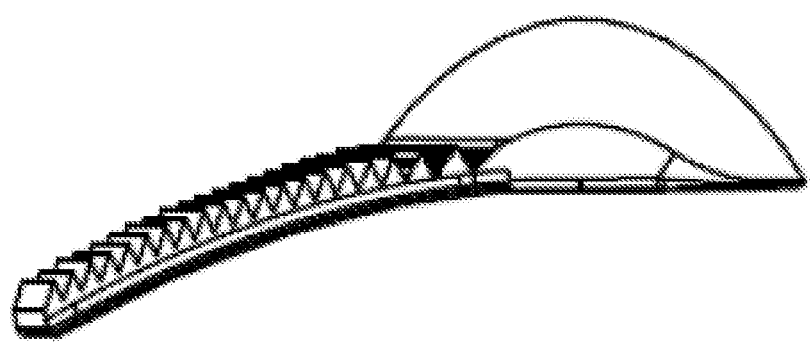
FIGS. 6A-6F depict various views of an exemplary hybrid lens according to instances of the disclosure.
Figure 6B:
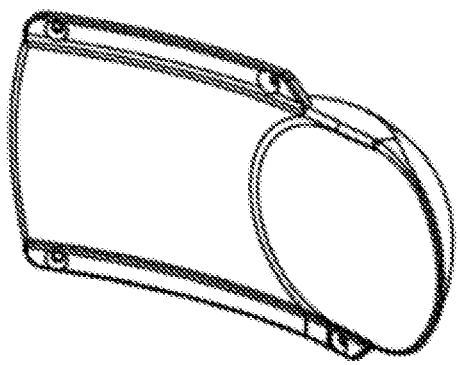
Figure 6C:
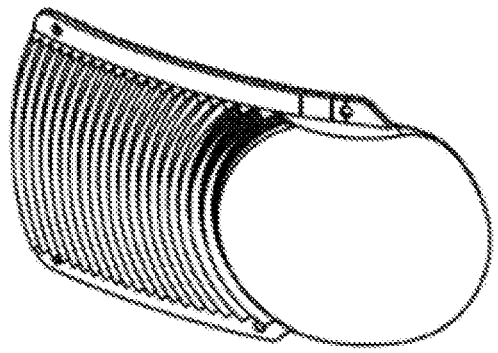
Figure 6D:
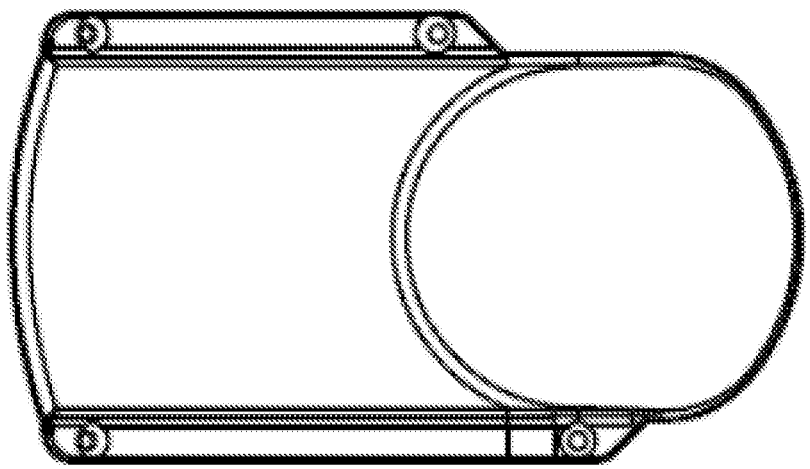
Figure 6E:
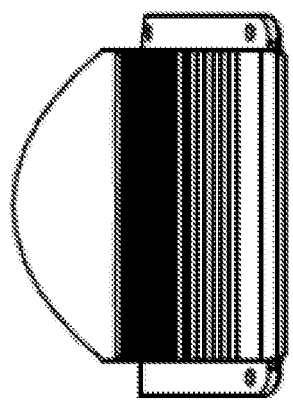
Figure 6F:
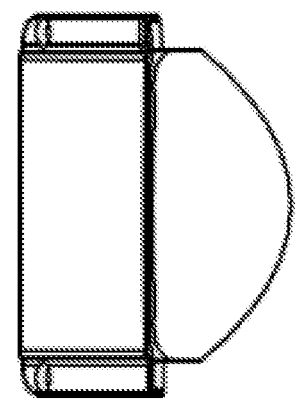

FIGS. 5K-M illustrate a left, top and right side view of a particular lens assembly 50, a user's eye 56, and display 58. FIGS. 5N-O provide perspective views of left lens assembly, display and user's left eye, respectively.

FIGS. 6A-6F illustrate another instance of a lens assembly that includes an aspheric portion and a Fresnel portion and that can be positioned with a headset for use in a virtual reality system. FIGS. 6A-6F illustrate front, top, and first and second lateral side views of the lens assembly. The lens assembly may be constructed as a single piece from a single material or may be constructed together from several parts. The parts may be attached and bonded together using adhesives with transparent properties that match the optical properties of the lens materials.

Figure 7A:
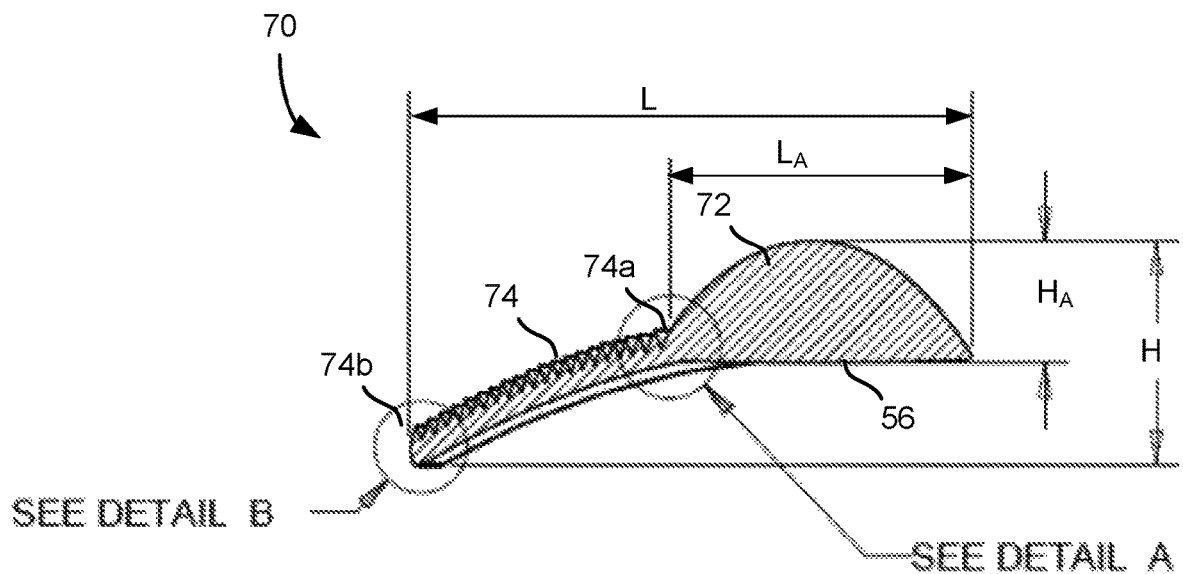
FIGS. 7A-7D depict various views of another exemplary hybrid lens according to instances of the disclosure.
Figure 7B:
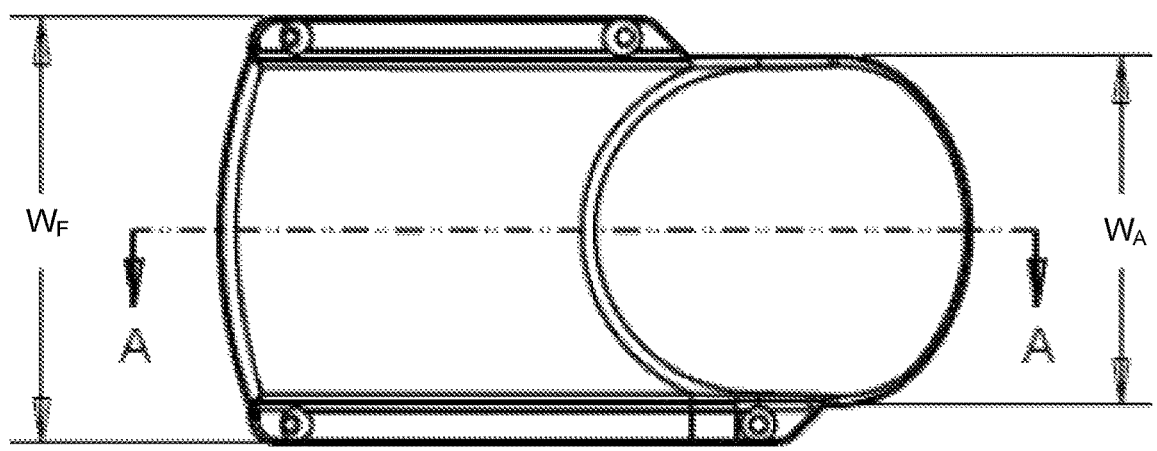

FIGS. 7A-7D illustrate another instance of a lens assembly that includes an aspheric portion and a Fresnel portion and that can be positioned with a headset for use in a virtual reality system, including detail of the grooves of the Fresnel portion of the lens assembly. FIGS. 7A-7B illustrate a side view and a top view of a lens assembly 70 that includes an aspheric element 72 and a Fresnel element 74 having a first end 74a coupled to the aspheric element 72 and a second end 74b. The arrangement, geometry, size and groove properties can be adjusted in different instances, but in the illustrated instance, the length L of the lens assembly 70 can typically be 70-80 mm, with the length $L_A$ of the aspheric element 72 being 35-45 mm. The height H of the lens assembly 70 can typically be 25-35 mm, with the height $H_A$ of the aspheric element 72 being 15-20 mm. The width of the lens assembly 70 can also vary.

Figure 7C:
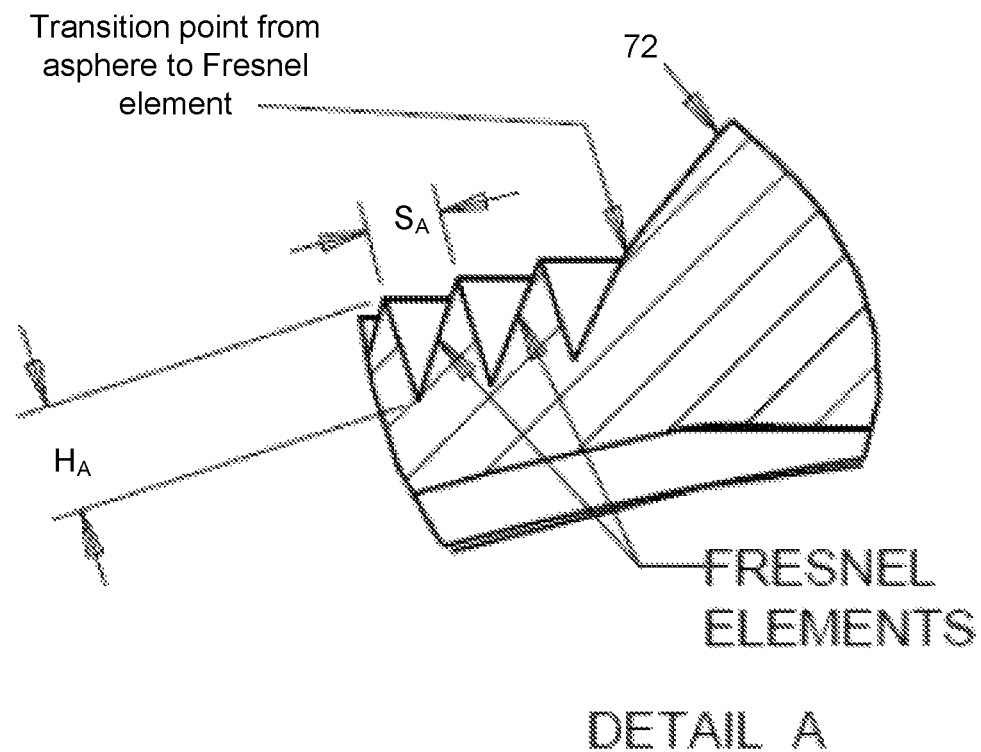
Figure 7D:
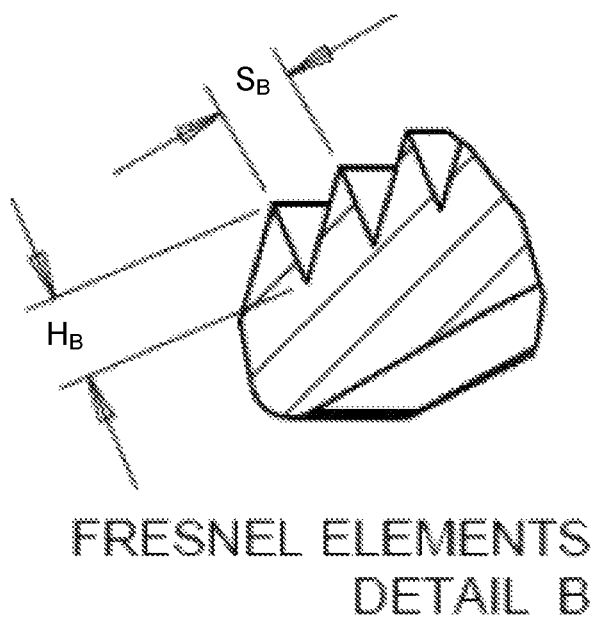

In the illustrated instance, the width $W_A$ of the aspheric element 72 is typically between about 30 to about 40 mm and the width $W_F$ of the Fresnel element 74 is typically between about 40 and about 50 mm. FIG. 7C illustrates a detail view of the first end 74a of the Fresnel element 74. The size and geometry of the grooves of the Fresnel element 74 can vary, but in the illustrated instance the spacing $S_a$ between the grooves is 1.5-2.0 mm and the height $H_a$ of the grooves is 2.5-3.0 mm. FIG. 7D illustrates a detail view of the second end 74b of the Fresnel element 74. The size and geometry of the grooves of the Fresnel element 74 can vary, but in the illustrated instance the spacing $S_b$ between the grooves is 1.5-2.0 mm and the height $H_b$ of the grooves is 2.0-2.5 mm, with $S_b$ and $H_b$ typically being less than $S_a$ and $H_a$ such that the spacing between the grooves and the height of the grooves decreases moving away from the aspheric element 72.

The first and second lens portions can be combined in a variety of ways to form the first and second lens. In one instance, the first and second lens portions can be unitary. For example, the aspheric lens and the Fresnel lens can be formed as one single lens during the manufacturing process. In another example, the aspheric lens and the Fresnel lens can be separate lenses and can be attached in a variety of ways. In one instance, one of the lenses can include a cavity or opening formed therein for receiving the other lens.

In one instance, the Fresnel lens can include a cavity formed therein for receiving the aspheric lens. Various techniques can then be used to attach the aspheric and Fresnel lenses, including but not limited to the use of an optical glue to permanently fuse the lens to one another. The optical elements to direct varying levels of focal power to the various viewing zones or sectors extending from each eye and through each hybrid lens section can be stamped, molded, carved, printed, vacuum formed, and otherwise manufactured as described herein. In one instance, as used herein focal power refers to the ability of a lens to converge or diverge light. The focal power can be determined as the inverse of the focal length (1/f).

The ratio of the first and second lens portions of the first and second lenses can also vary. The ratio of aspheric lens to Fresnel lens can be chosen based on optical performance and a maximized field of view. For example, in one instance the size of the aspheric lens can be increased to an upper limit or maximum but can be limited based on the thickness of the lens.

The position of the aspheric lens relative to the Fresnel lens can vary in order to extend the field of the view of the first and second optical elements of the lens assembly. In one instance, the aspheric lens can be positioned in the center of the Fresnel lens such that the centers of the lenses are substantially in the same location. In another instance, the aspheric lens can be positioned such that the center of the aspheric lens is offset from the center of the Fresnel lens. The aspheric lens can be offset such that the Fresnel lens is still surrounding the aspheric lens and thus Fresnel lens is positioned on both sides of the aspheric lens, or the aspheric lens can be offset such that the Fresnel lens is only positioned on one side of the aspheric lens. The arrangement wherein F1 and F2 are the same or different can be used to centralize or offset the lens elements.

In either instance, the side of the lens with the larger portion of Fresnel lens can be positioned in the headset such that the larger portion of Fresnel lens (See large length F1 in FIGS. 1A and 1B) is located on the outside portion of the head of user at the user's temple. The side of the lens with all or most of the aspheric lens is located closer to a midline of the head of the user. For example, this can be seen in FIG. 3A. Thus, the aspheric lens is positioned over the eyes of the user for increased optical performance at the center of the field of view and the Fresnel lens extends further out on the temple of the user for increased optical performance at the periphery of the field of view.

With first and second lens portions being formed from different types of lenses, there will be a transition between the lenses where the two lens portions meet. This transition can be abrupt or smooth. The Fresnel lens can be formed as a unitary lens or can be a plurality of layers or components. In one instance, the Fresnel elements are one section of the hybrid lens and the asphere is another section. The two sections can be separate objects that are oriented relative to each other and bonded or secured to maintain the appropriate orientation.

Various coatings can be applied to the first and second lens portions for a variety of purposes. One such coating that can increase optical performance of a lens is an anti-reflective coating. While any portion of the lenses can have an anti-reflective coating, in one instance, the aspheric lens of the first lens portion of the first and second lenses can receive an anti-reflective coating to improve the optical performance in the central portion of the field of view.

In one instance, without the coating, the scattering of light increases. The increases scattering can lead to an increase in glare and other optical artifacts and distortion. If the first and second lens portions are formed separately, the coating can be applied to either portion of the lens. If the first and second lens portions are unitary, one of the lens portions can be masked off to allow the other lens portion to receive the coating.

The size of the first and second lens portions can also vary. While the instance shown herein in FIG. 1A, 1B and type 1 and 2 of FIG. 2A illustrate circular or oval-shaped lens, neither of those shapes is necessary to achieve first and second lenses with the required field of view. Any shape is sufficient as long as the lenses can fit inside a headset and cover the required field of view.

FIG. 8 is a block diagram of a virtual reality system for use with a headset. The system of FIG. 8 includes transmitters 42, 44, 46 and 48, receivers 812, 813, 814, 815, 816 and 817, player computers 820 and 822, transducers 832 and 836, motors 833 and 837, virtual display 834 and 838, accessories 835 and 839, players 840 and 842, game computer 850, environment devices 862 and 864, networking computer 870, and network 880.

Receivers 812-1017 may be placed on a player 840 or an accessory 835. Each receiver may receive one or more signals from one or more of transmitters 42-1008. The signals received from each transmitter may include an identifier to identify the particular transmitter. In some instances, each transmitter may transmit an omnidirectional signal periodically at the same point in time. Each receiver may receive signals from multiple transmitters, and each receiver may then provide signal identification information and timestamp information for each received signal to player computer 820. By determining when each transmitter signal is received from a receiver, player computer 820 may identify the location of each receiver.

Player computer 820 may be positioned on a player, such as for example on the back of a vest worn by a player. For example, with respect to FIG. 8, player computer 820 is positioned on a back of a player 840. A player computer may receive information from a plurality of receivers, determine the location of each receiver, and then locally update a virtual environment accordingly. Updates to the virtual environment may include a player's point of view in the environment, events that occur in the environment, and video and audio output to provide to a player representing the player's point of view in the environment along with the events that occur in the environment.

Player computer 820 may also communicate changes to the virtual environment determined locally at the computer to other player computers, such as player computer 822, through game computer 850. In particular, a player computer for a first player may detect a change in the player's position based on receivers on the player's body, determine changes to the virtual environment for that player, provide those changes to game computer 850, and game computer 850 will provide those updates to any other player computers for other players in the same virtual reality session, such as a player associated player computer 822.

A player 840 may have multiple receivers on his or her body, as shown in FIG. 8. The receivers receive information from the transmitters and provide that information to the player computer. In some instances, each receiver may provide the data to the player computer wirelessly, such as for example through a radiofrequency signal such as a Bluetooth signal. In some instances, each receive may be paired or otherwise configured to only communicate data with a player's computer. In some instances, a particular player computer may be configured to only receive data from a particular set of receivers. Based on physical environment events such as a player walking, local virtual events that are provided by the player's computer, or remote virtual events triggered by an element of the virtual environment located remotely from the player, haptic feedback may be triggered and sensed by a player. The haptic feedback may be provided in the terms of transducer 832 and motor 833. For example, if an animal or object touches a player at a particular location on the player's body within the virtual environment, a transducer located at that position may be activated to provide a haptic sensation of being touched by that object.

Figure 3A:
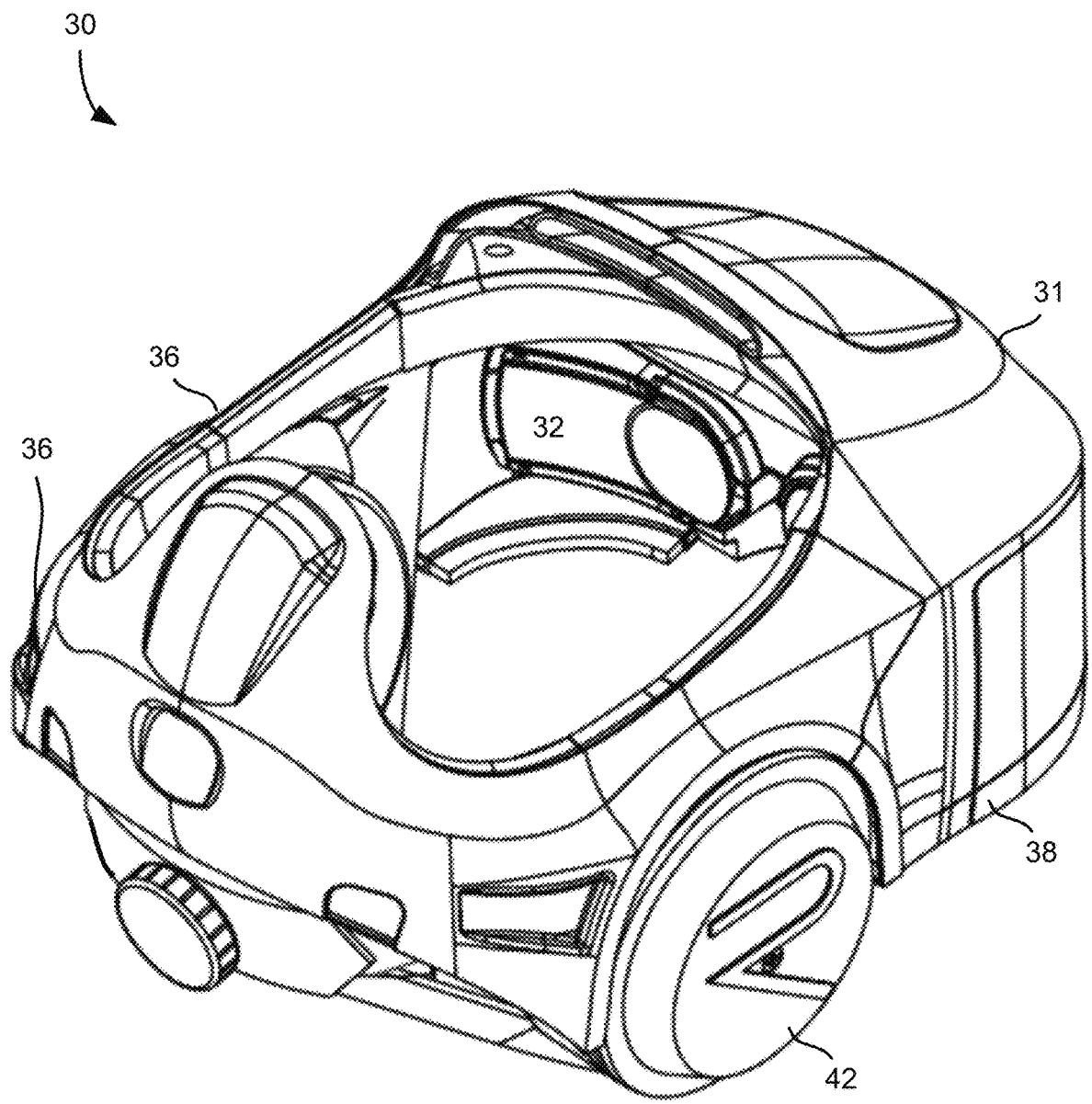
FIGS. 3A-3K are schematic representations of various views of a viewing device that includes one or more hybrid lens assemblies according to instances of the disclosure. instance
Figure 3B:
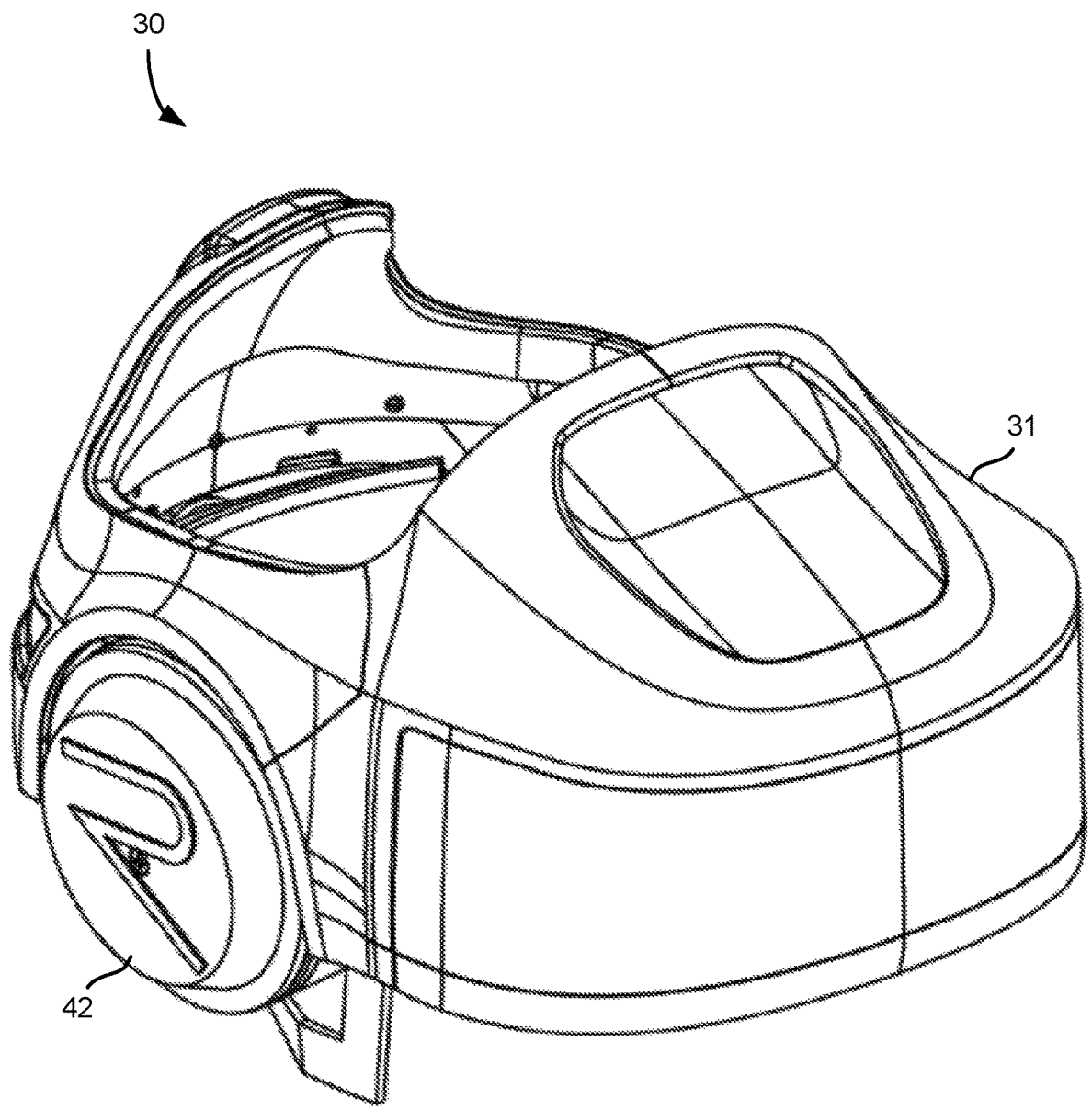
Figure 3C:
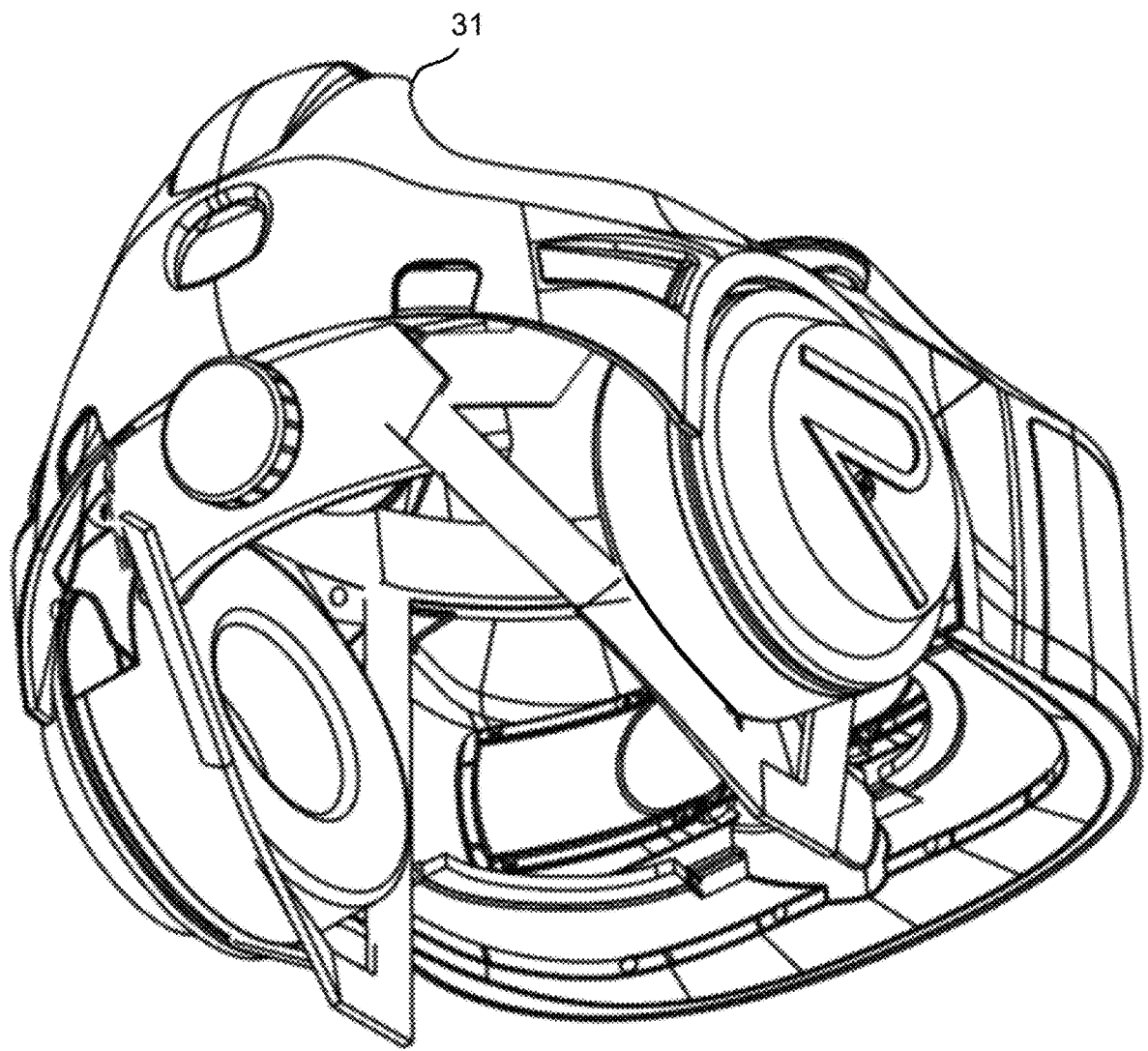
Figure 3D:
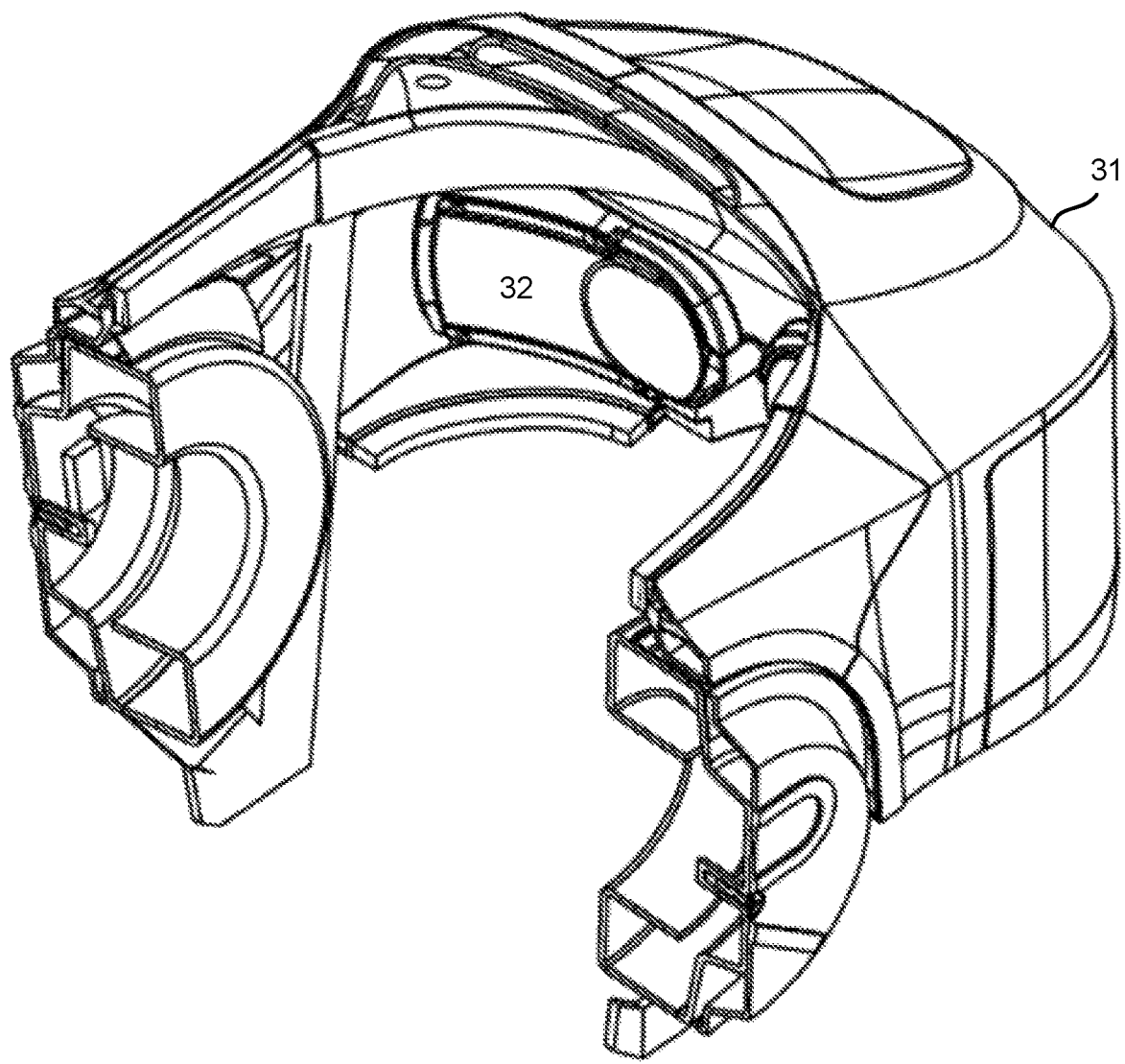
Figure 3E:
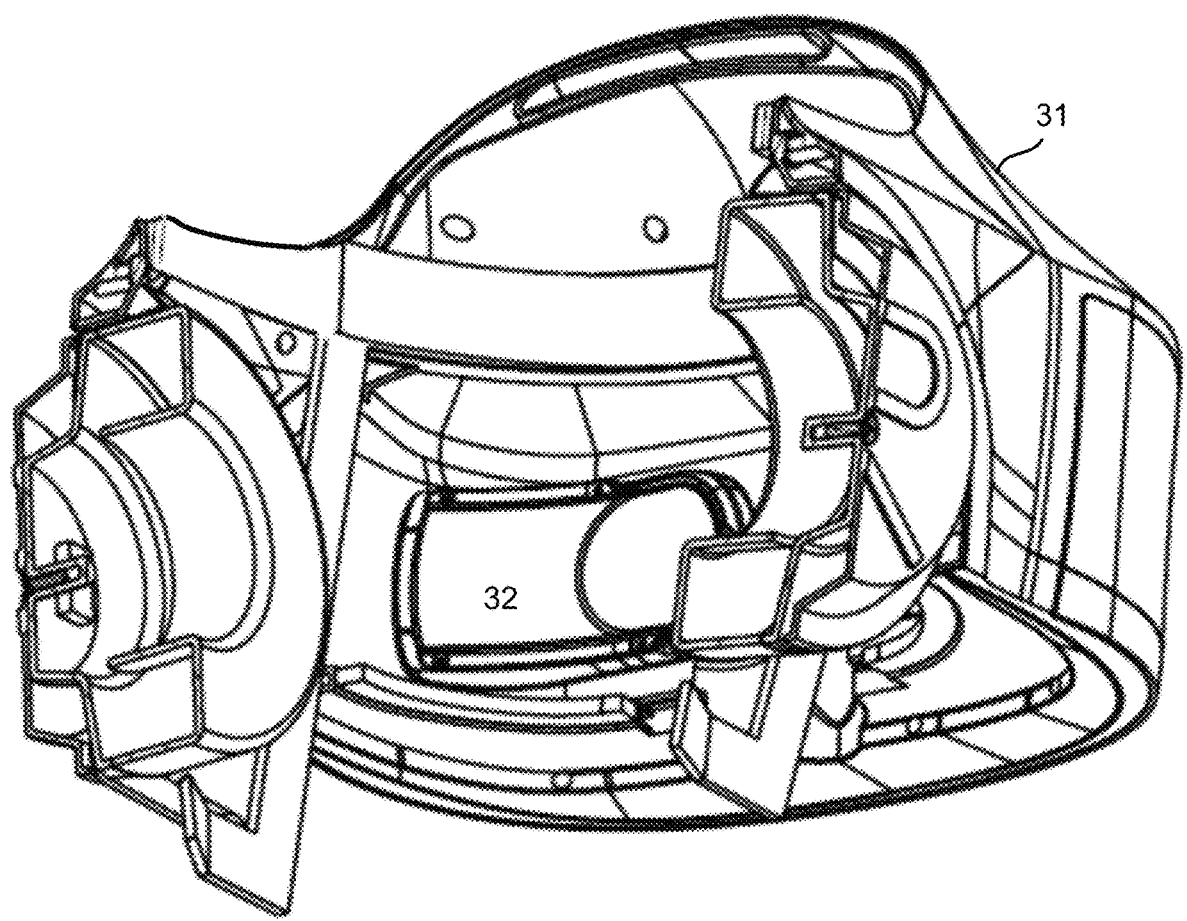
Figure 3F:
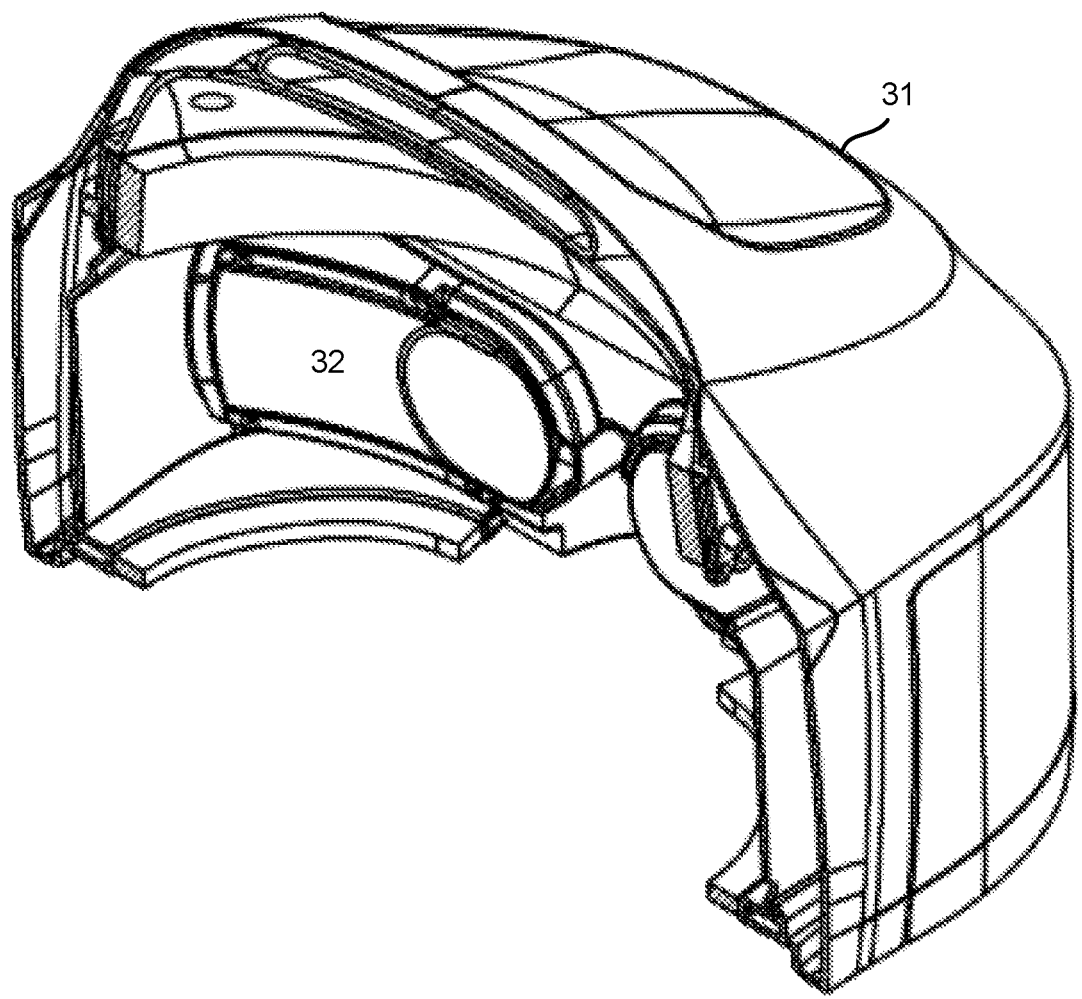
Figure 3G:
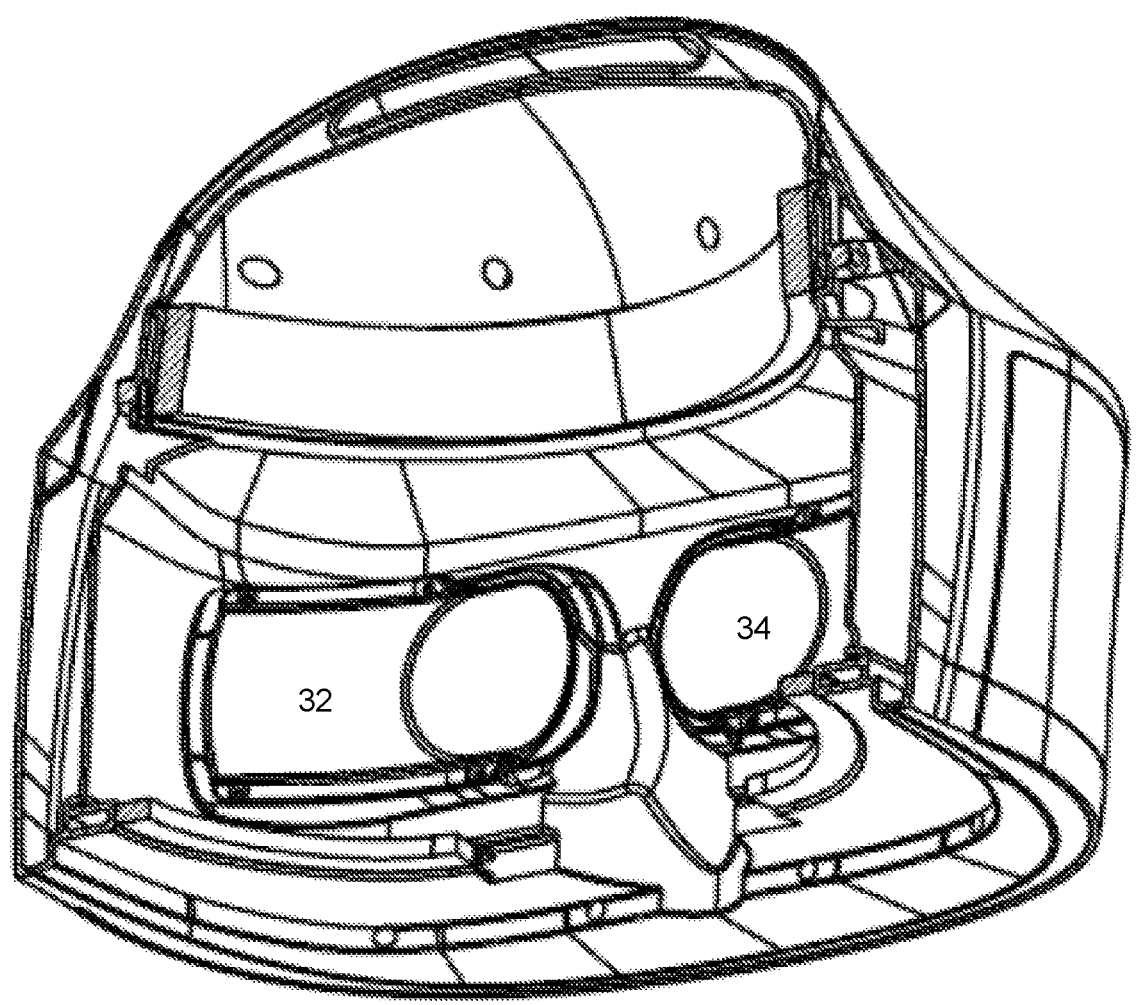
Figure 3H:
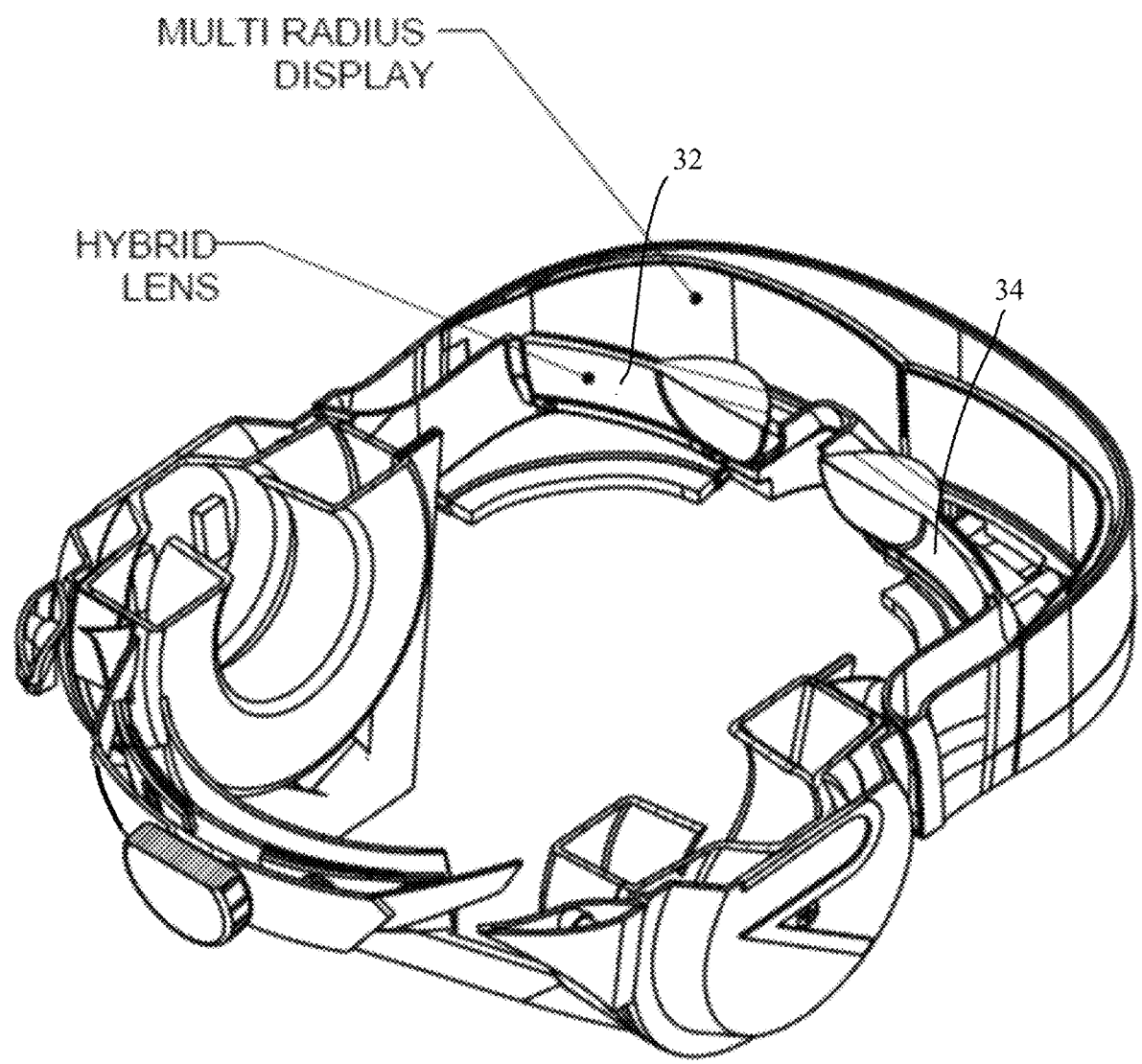
Figure 3I:
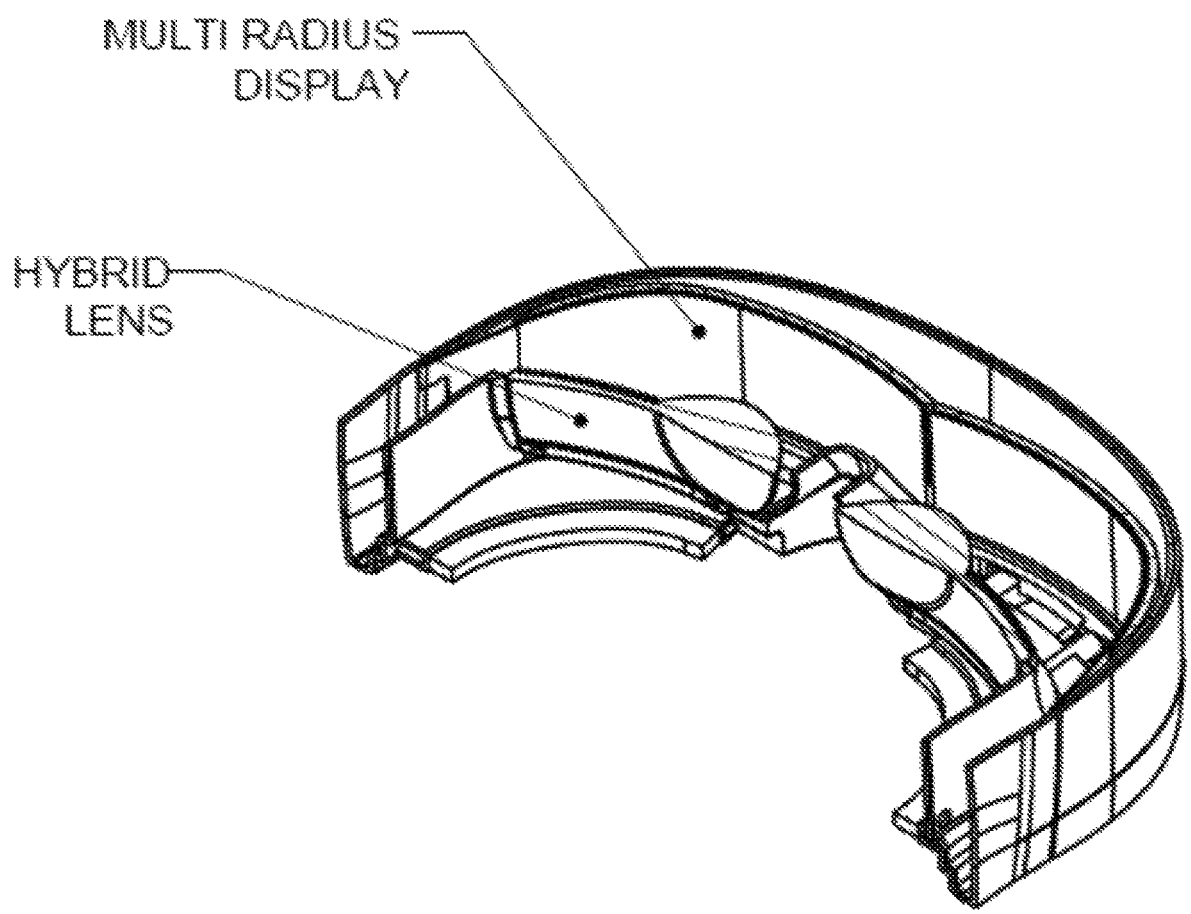
Figure 3J:
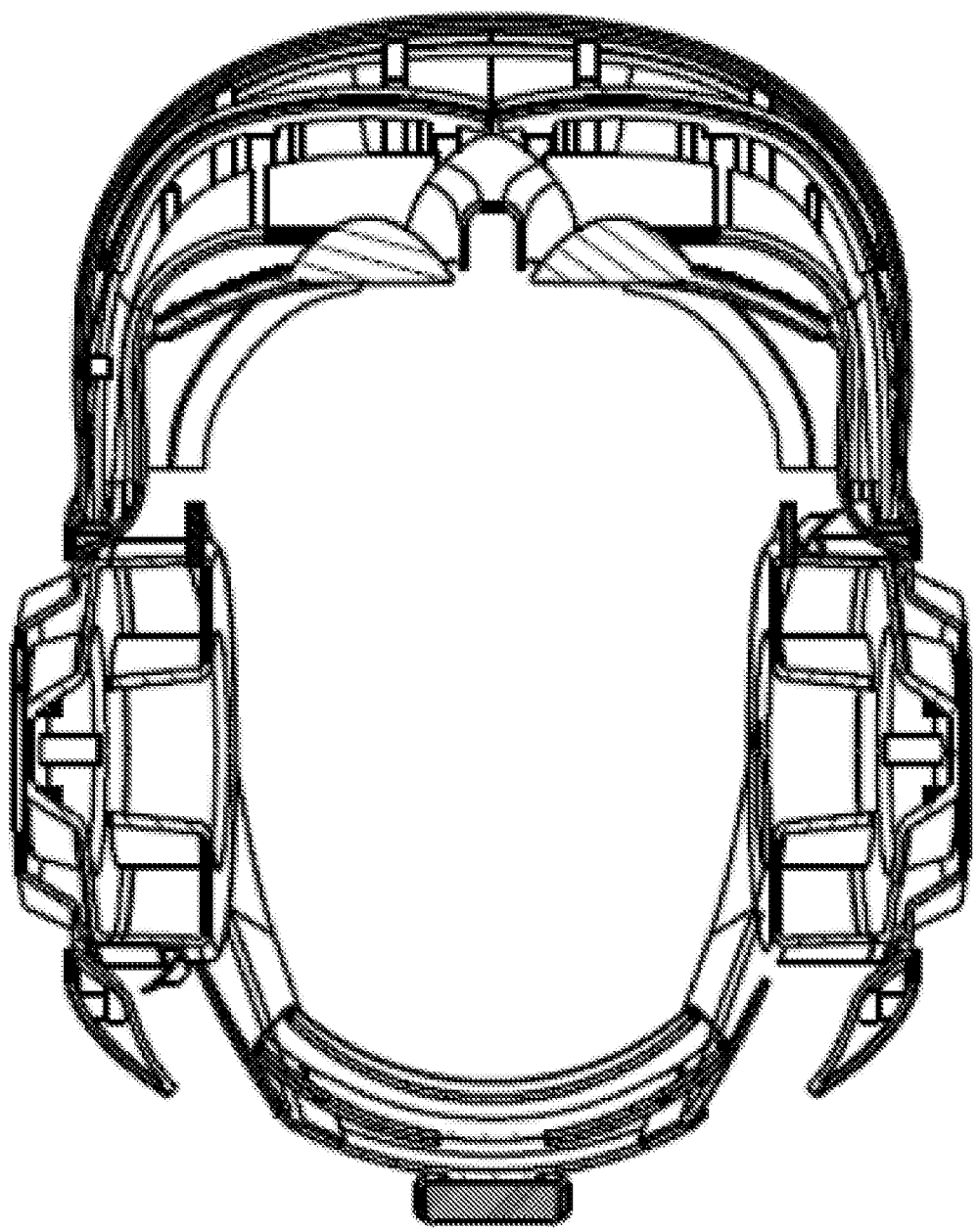
Figure 3K:
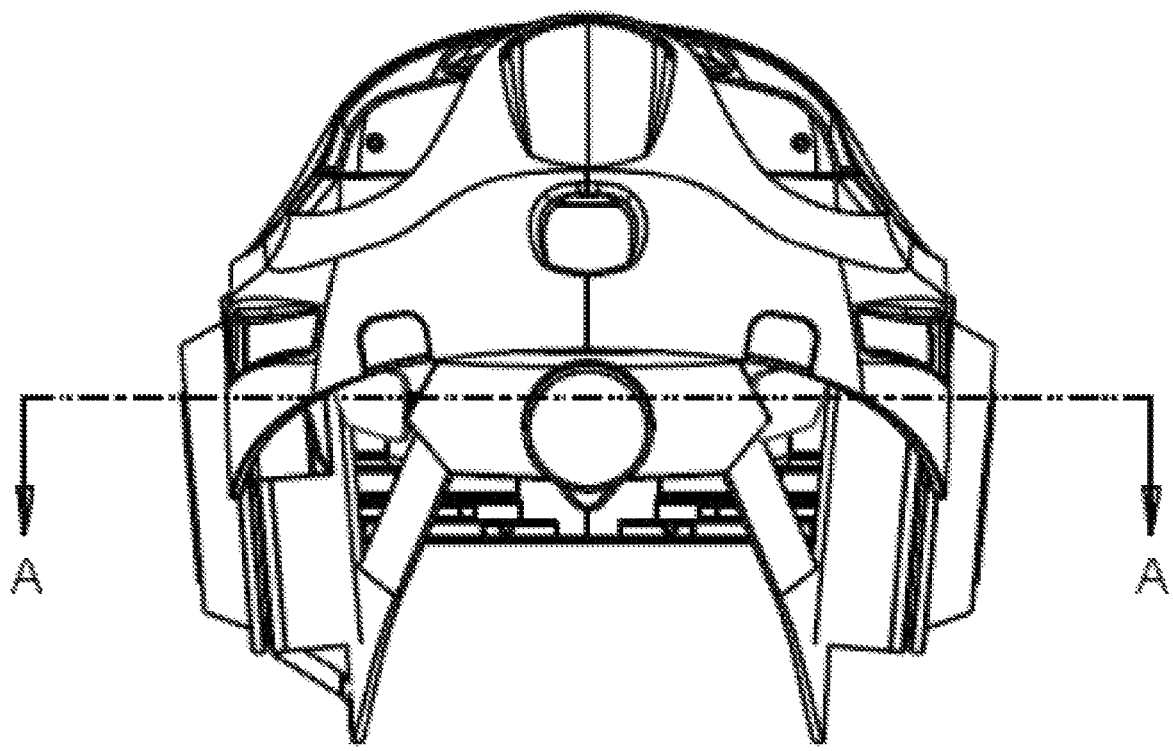
Figure 3L:
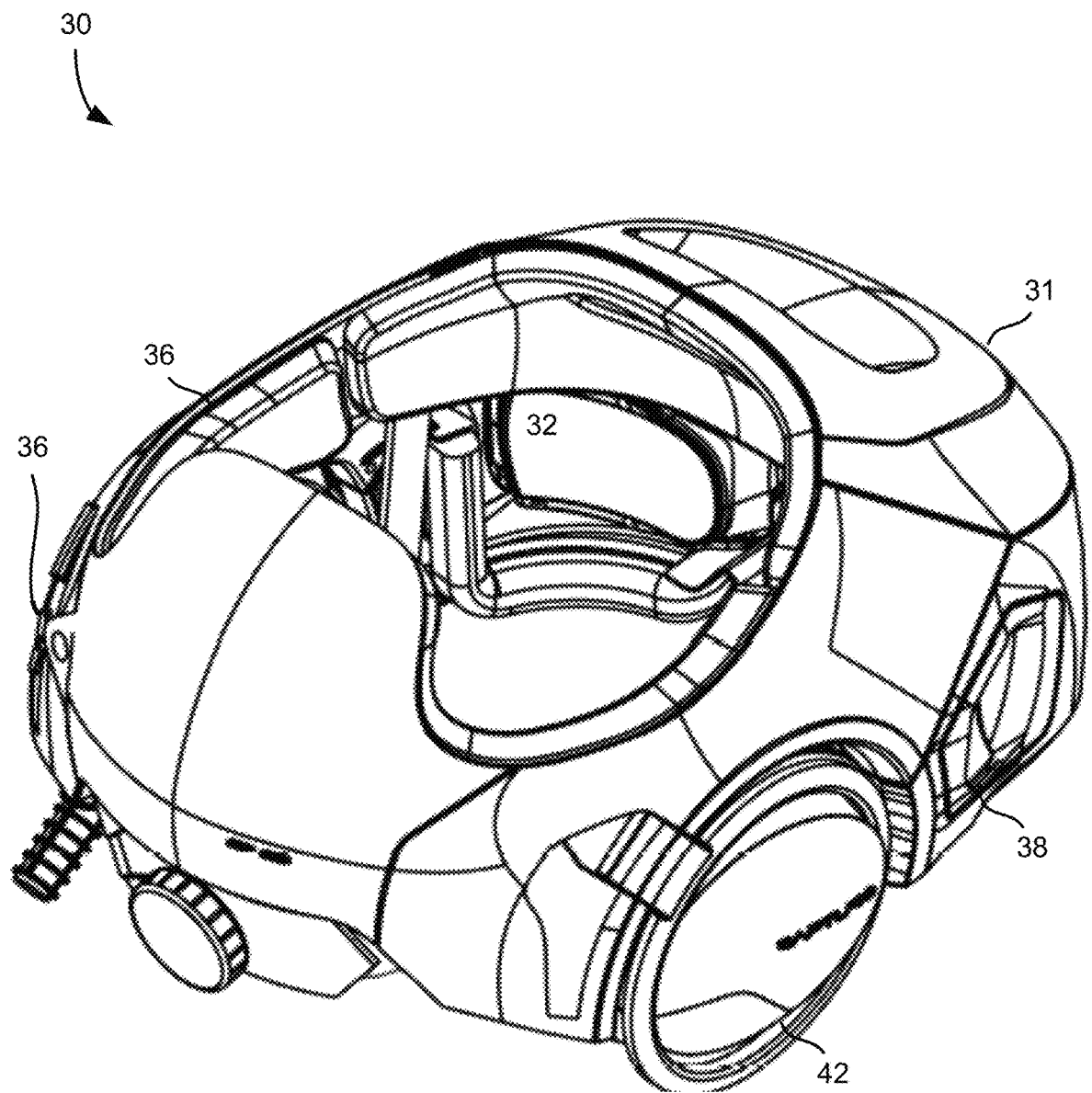
FIGS. 3L-3U are schematic representations of various views of another viewing device that includes one or more hybrid lens assemblies according to instances of the disclosure.
Figure 3M:
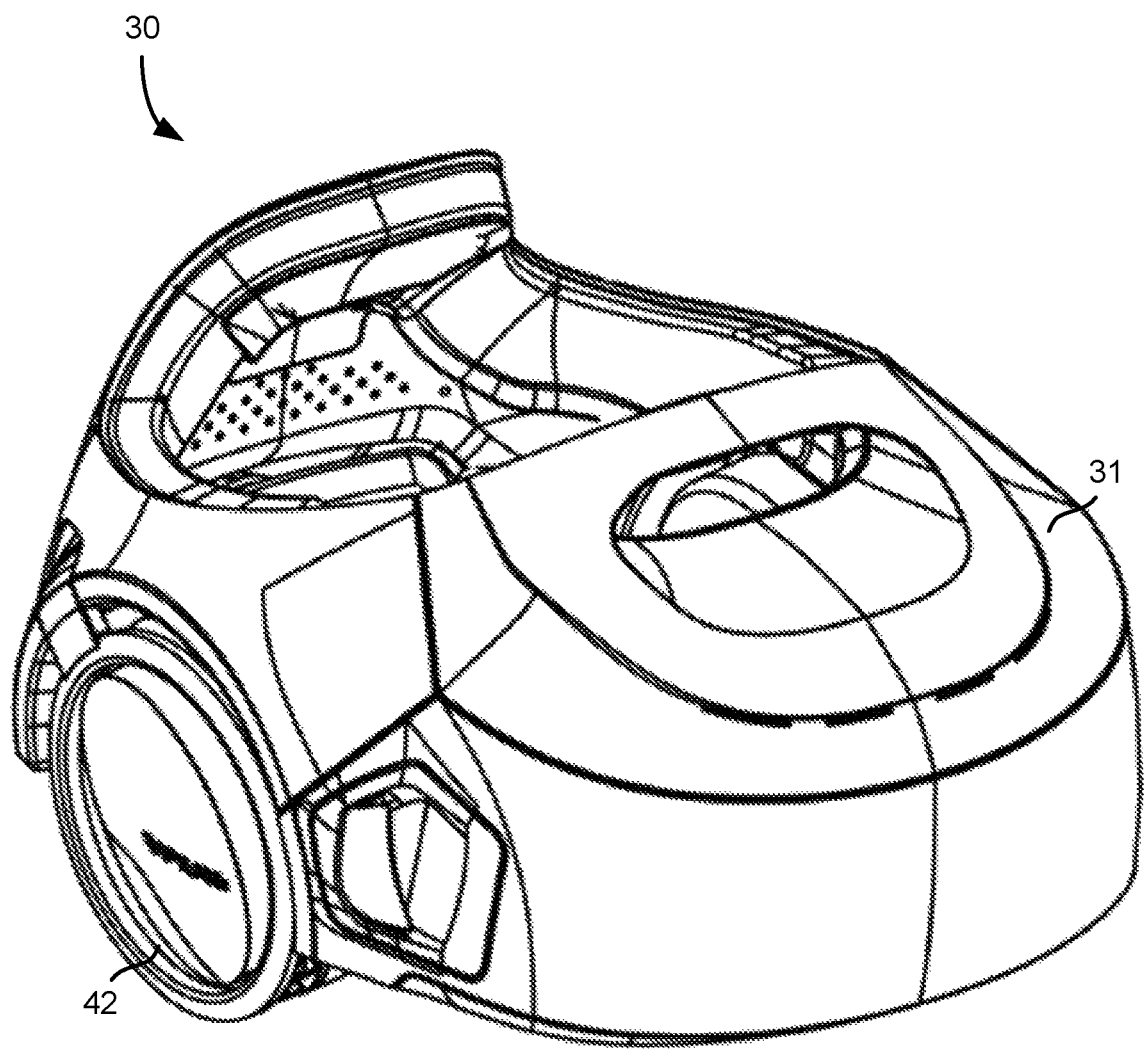
Figure 3N:
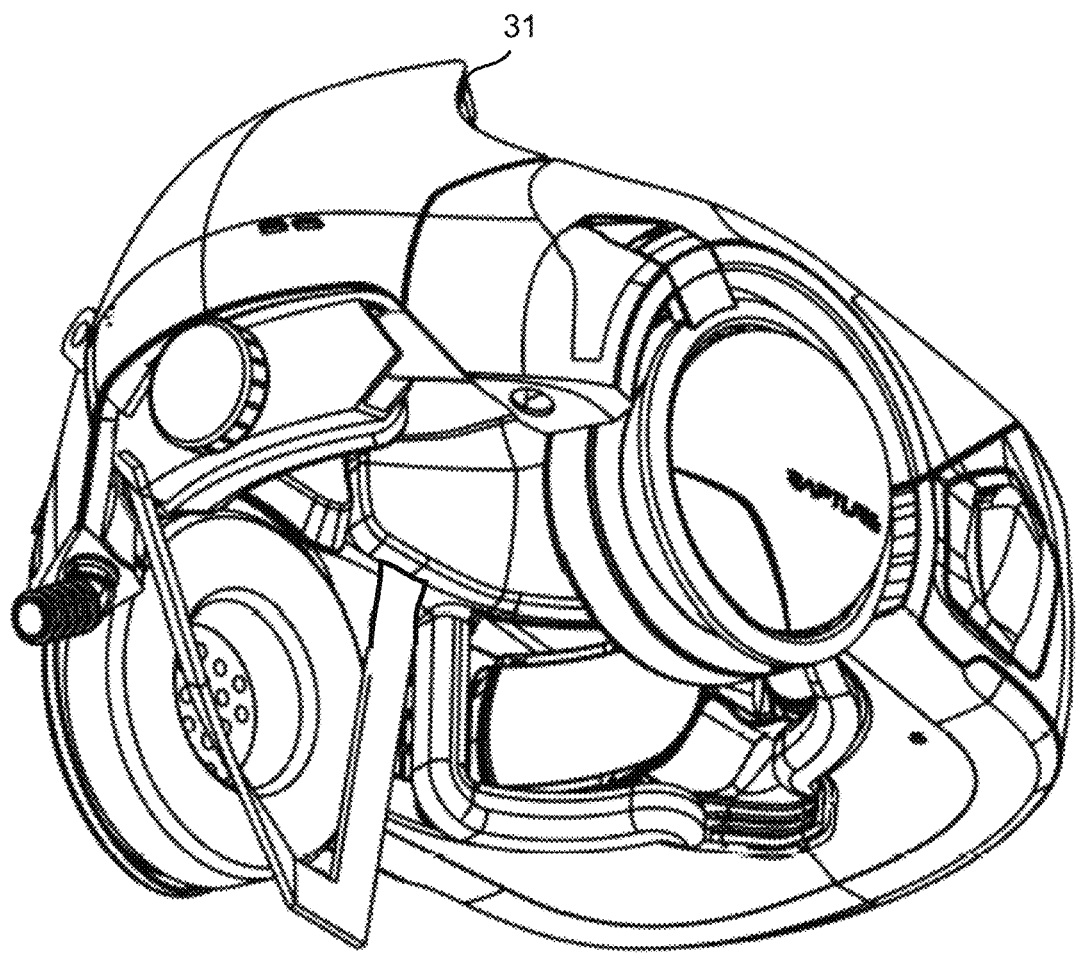
Figure 3O:
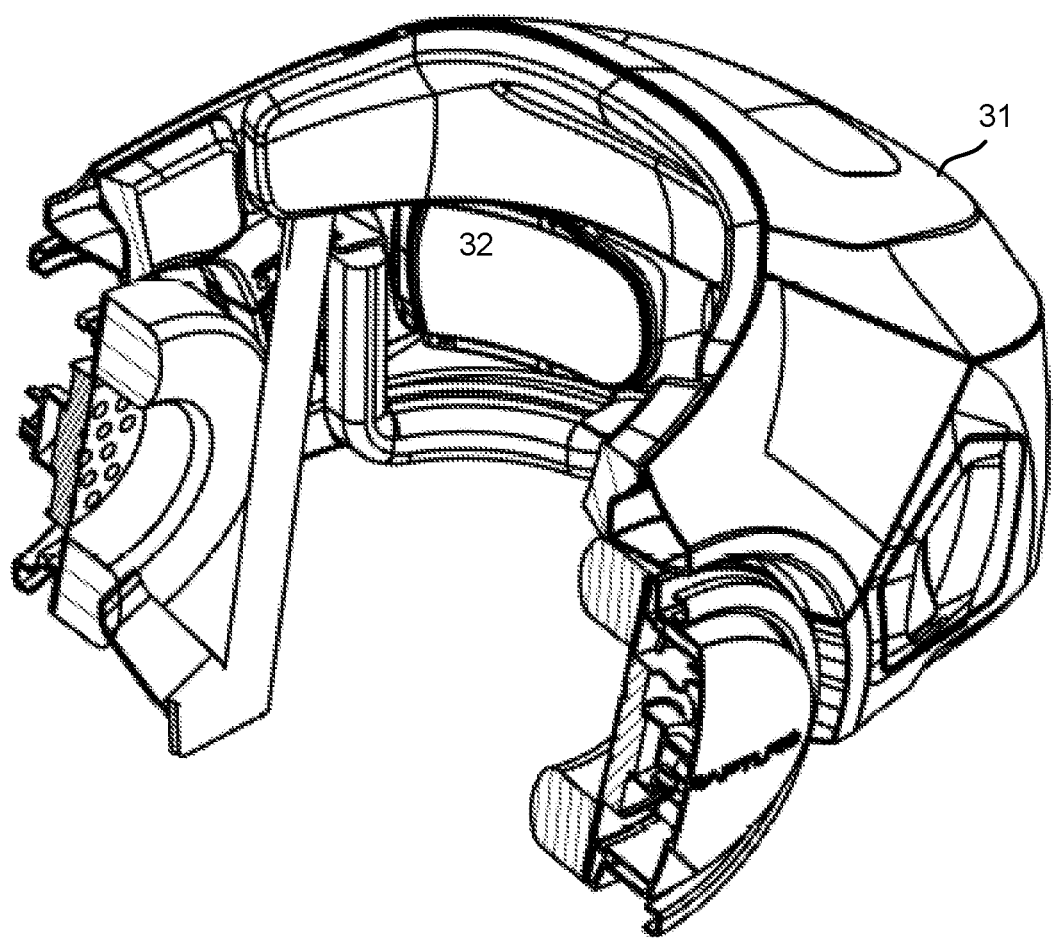
Figure 3P:
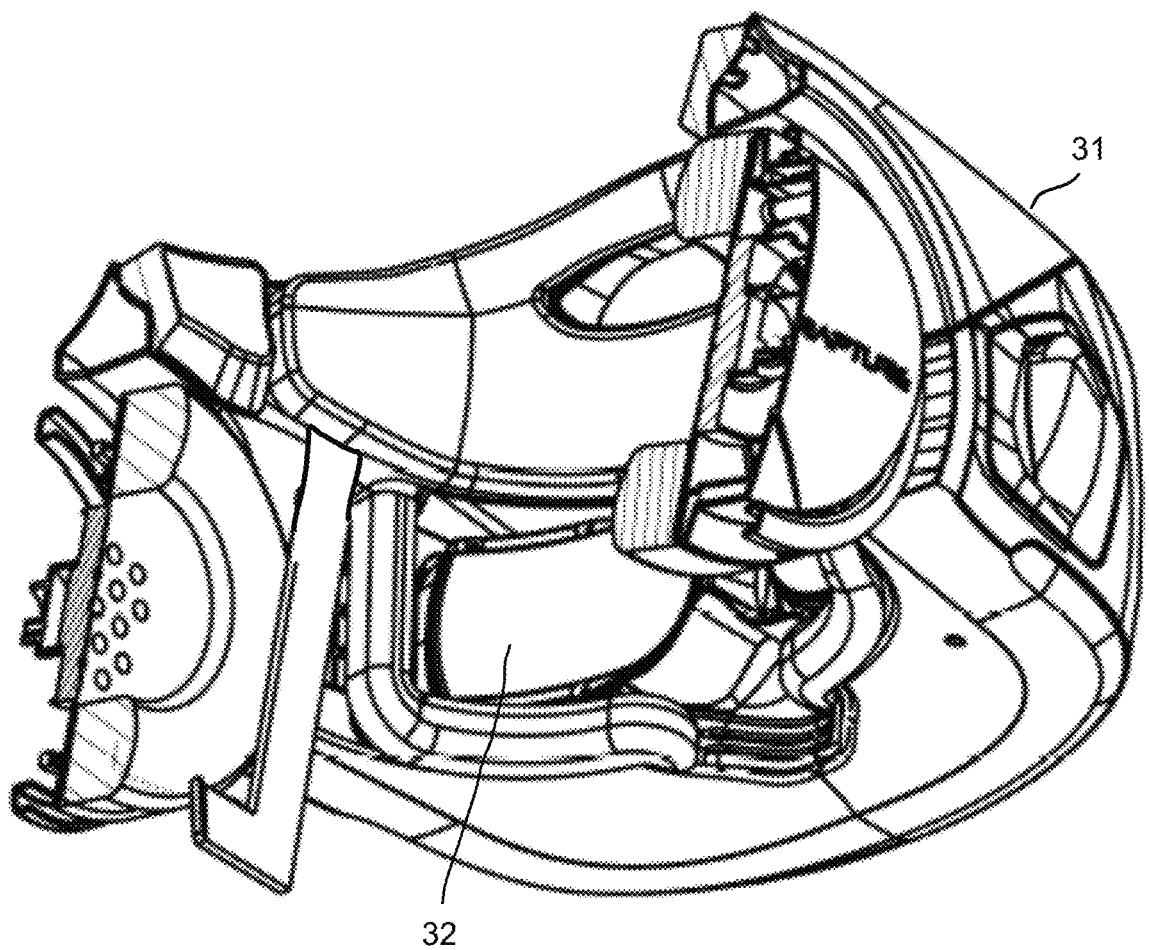
Figure 3Q:
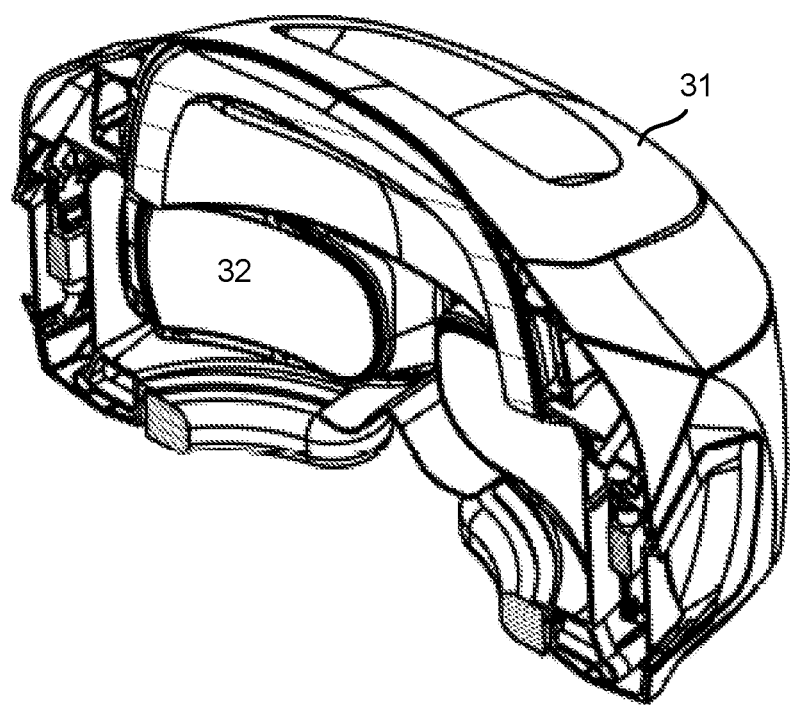
Figure 3R:
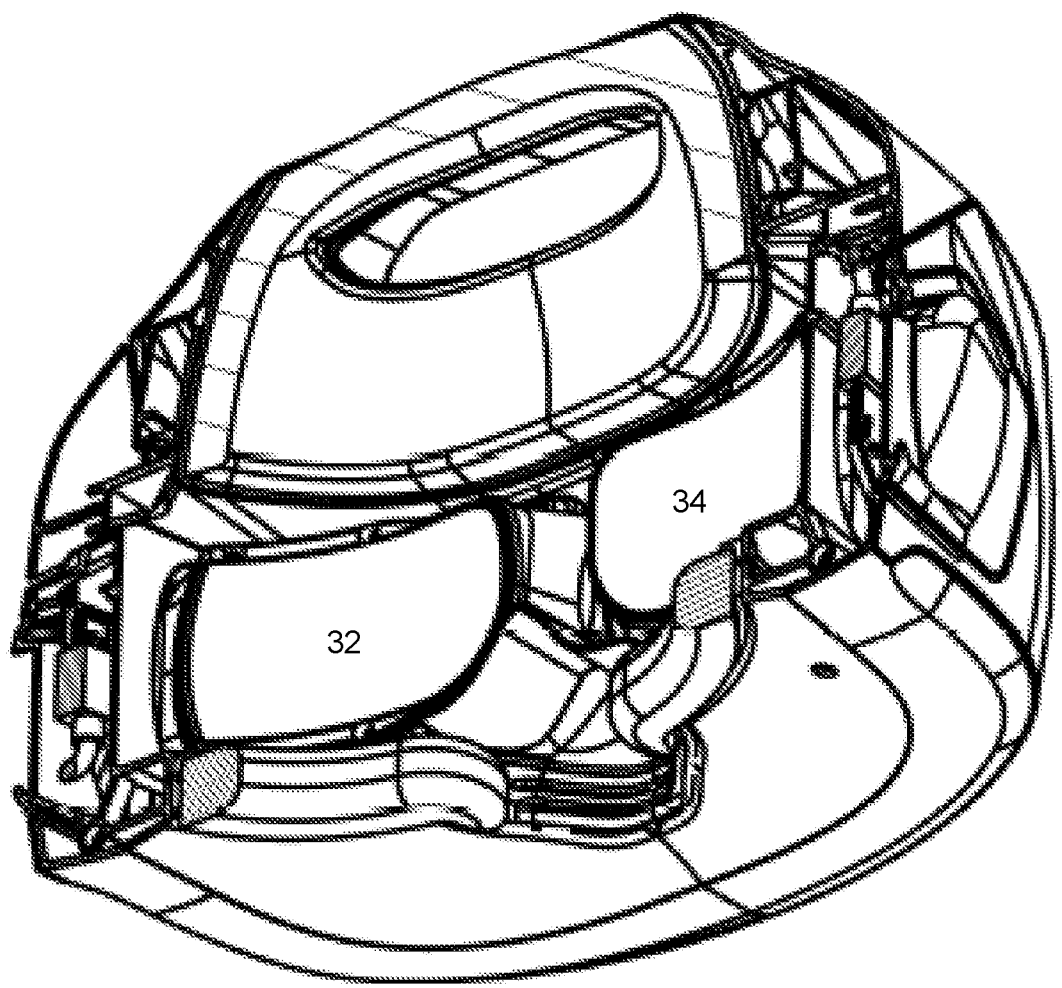
Figure 3S:
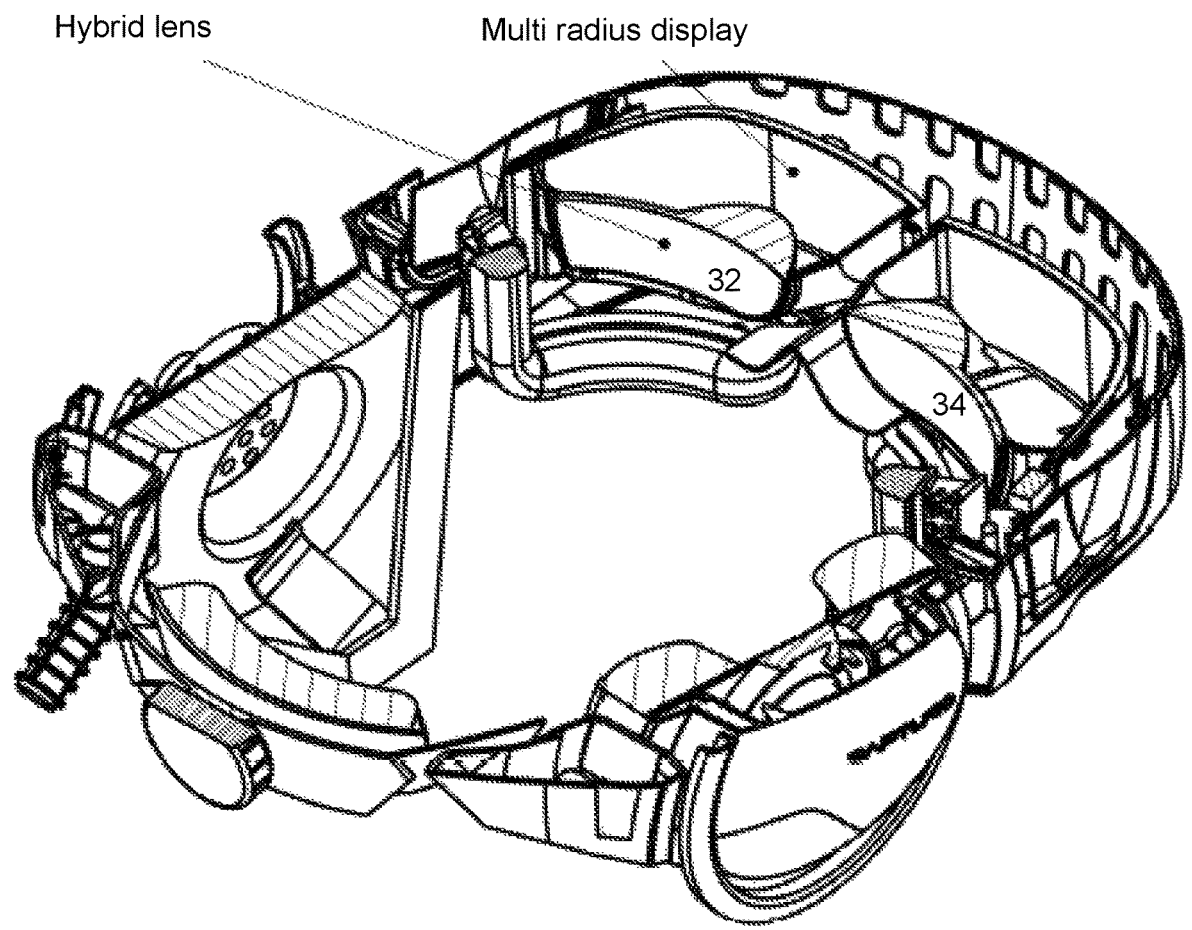
Figure 3T:
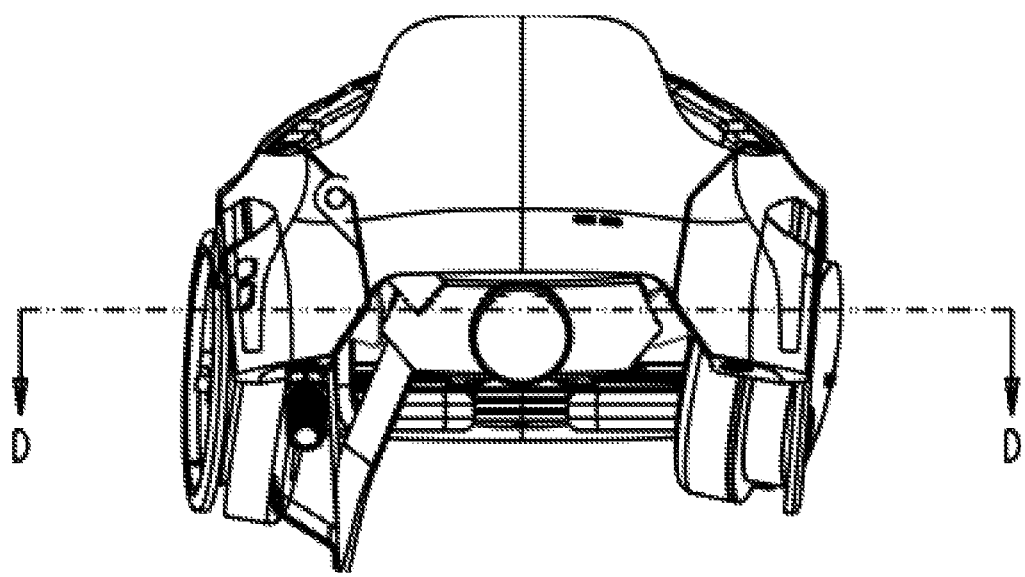
Figure 3U:
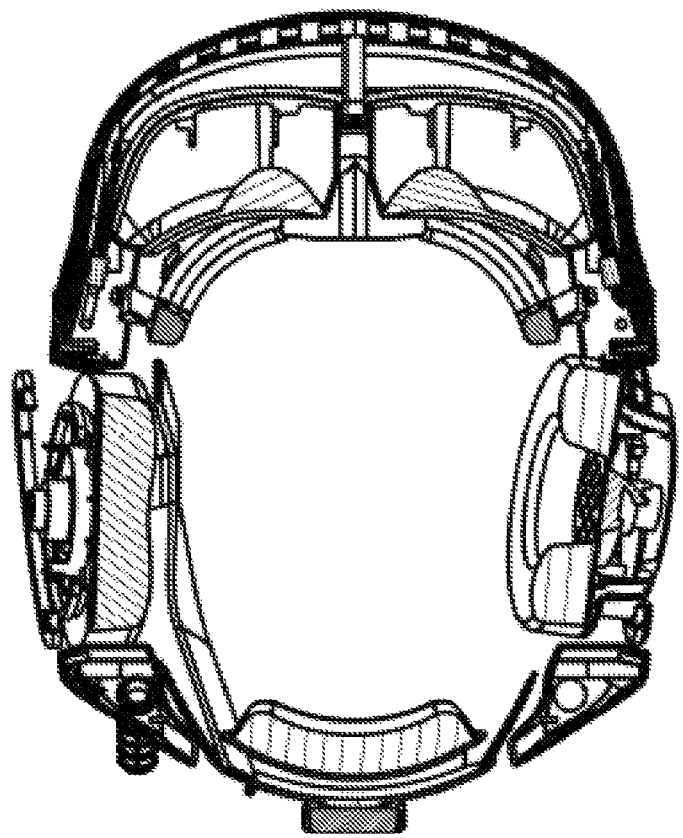

Visual display 834 may be provided through a headset worn by player 840, such as exemplary headset 30 in FIG. 3A The virtual display 834 may include a helmet, virtual display, and other elements and components needed to provide a visual and audio output to player 840. In some instances, player computer 820 may generate and provide virtual environment graphics to a player through the virtual display 840.

Accessory 835 may be an element separate from the player, in communication with player computer 820, and displayed within the virtual environment through visual display 834. For example, an accessory may include a gun, a torch, a light saber, a wand, or any other object that can be graphically displayed within the virtual environment and physically engaged or interacted with by player 840. Accessories 835 may be held by a player 840, touched by a player 840, or otherwise engaged in a physical environment and represented within the virtual environment by player computer 820 through visual display 834.

Game computer 850 may communicate with player computers 820 and 822 to receive updated virtual information from the player computers and provide that information to other player computers currently active in the virtual reality session. Game computer 850 may store and execute a virtual reality engine, such as Unity game engine, Leap Motion, Unreal game engine, or another virtual reality engine. Game computer 850 may also provide virtual environment data to networking computer 870 and ultimately to other remote locations through network 880. For example, game computer 850 may communicate over network 880 in the system of FIG. 8

Environment devices 862 may include physical devices part of the physical environment that may interact or be detected by a player 840 or other aspects of the gaming system. For example, and enter environment device 862 may be a source of heat, cold, wind, sound, smell, vibration, or some other sense that may be detected by a player 840.

Transmitters 802-808 may transmit a synchronized wideband signal within a pod to one or more receivers 812-817.

Logic on the receiver and on a player computing device, such as player computing device 820 or 822, may enable the location of each receiver to be determined in a universal space within the pod.

Figure 9:
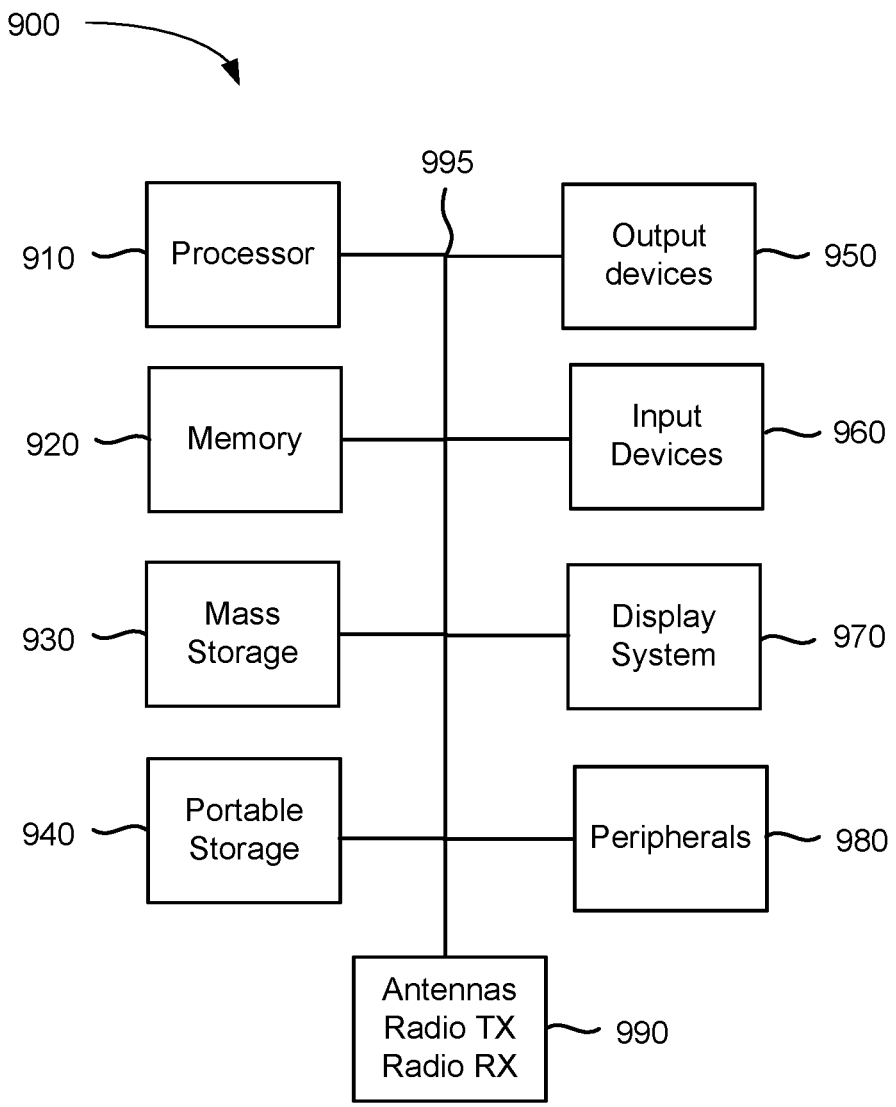
FIG. 9 illustrates an exemplary computing system 900 that may be used to implement a computing device for use with the present technology.

FIG. 9 illustrates an exemplary computing system 900 that may be used to implement a computing device for use with the present technology. System 900 of FIG. 9 may be implemented in the contexts of the likes of player computing devices 820 and 822 and game computer 850. The computing system 900 of FIG. 9 includes one or more processors 910 and memory 910. Main memory 910 stores, in part, instructions and data for execution by processor 910. Main memory 910 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 910 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing instances of the present invention for purposes of loading that software into main memory 910.

Portable storage device 940 operates in conjunction with a portable non-volatile storage medium, such as a compact disk, flash drive, or other storage medium, to input and output data and code to and from the computer system 900 of FIG. 9. The system software for implementing instances of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information, and processes the information for output to the display device.

Peripherals 980 may include any type of computer support device to add additional functionality to the computer system. For example, peripheral device(s) 980 may include a modem or a router.

The components contained in the computer system 900 of FIG. 9 are those typically found in computer systems that may be suitable for use with instances of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Various instances of the systems and methods may include and/or utilize a computer device or a source of electromagnetic radiation such as one or more LEDs or other sources such as video, laser, and others. In various instances, a computer may be in communication with a server or server system utilizing any suitable type of communication including, for example, wired or wireless digital communications.

The examples presented herein are intended to illustrate potential and specific implementations of the present invention. The examples are intended primarily for purposes of illustration of the invention for those skilled in the art. No particular aspect or aspects of the examples are necessarily intended to limit the scope of the present invention.

The figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

The lens assembly instances and components thereof can be used as part of a computer display or with a computer or computer-based device as a content source. A "computer," "computer system," "component," "computer device," "computing device" or "processor" may be, for example and without limitation, a processor, microcomputer, minicomputer, server, mainframe, laptop, personal data assistant (PDA), wireless e-mail device, cellular phone, pager, processor, watch, wearable device, backpack, VR goggles, projector, tracking device, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed instances.

In various instances, "VR headset", "content source" a "simulation," "gaming platform," "tracking system", "triggering system", "synchronization system," "platform," or "component" may include one or more of the optical elements and assemblies described herein and various computers or computer systems, or may include a reasonable combination of software, firmware, and/or hardware.

In various instances of the present invention, a single component may be replaced by multiple components, and multiple components may be replaced by a single component, to perform a given function or functions. Except where such substitution would not be operative to practice instances of the present invention, such substitution is within the scope of the present invention. Various lens and optical elements can be arranged in a series of lenses or compound lenses can be used to reduce the overall number of lenses optical elements.

Various groove profiles such as sawtooth, triangular, sinusoidal, hyperbolic, and other curves and piecewise linear and smooth sections can be used. In one instance, the grooves are arranged in a symmetric pattern. In one instance, the grooves are asymmetric or partially asymmetric or partially symmetric relative to one or more points, lines or planes. In one instance a constant curvature viewing screen or panel is provided in conjunction with one or two hybrid lens assemblies. In one instance, a first hybrid assembly and a second hybrid assembly are provided with a headset and a curved viewing screen.

In general, it may be apparent to one of ordinary skill in the art that various instances described herein, or components or parts thereof, may be implemented in many different instances of lens, materials, lenslet arrays, and other beam directing and electromagnetic wave directing elements. The lenses and assemblies and optical elements, can be molded, cut, printed, stamped, and fabricated using various suitable methods as known and described herein.

Reference throughout this specification to "one instance" or "an instance" indicates that a particular feature, structure, or characteristic described in connection with the instance is included in at least one instance. Thus, the appearances of the phrases "in one instance" or "in an instance" in various places throughout this specification are not necessarily all referring to the same instance. In particular, an "instance" may be a system, an article of manufacture (such as a computer readable storage medium), a method, and/or a product of a process.

The phrases "connected to," and "in communication with" refer to any form of interaction between two or more entities, including optical, mechanical, electrical, magnetic, and electromagnetic interaction. Two components may be connected to each other, even though they are not in direct physical contact with each other and even though there may be intermediary devices, assemblies, components, or optical paths between the two components.

The described features, operations, or characteristics may be combined in any suitable manner in one or more instances. It will also be readily understood that the order of the steps or actions of the methods described in connection with the instances disclosed herein may be changed, as would be apparent to those skilled in the art. Thus, any order in the drawings or detailed description is for illustrative purposes only and is not meant to imply a required order, unless specified to require an order. In the following description, numerous details are provided to give a thorough understanding of various instances. One skilled in the relevant art will recognize, however, that the instances disclosed herein can be practiced without one or more of the specific details, or with other methods, components, materials, etc. In other instances, well-known structures, materials, or operations are not shown or described in detail to avoid obscuring aspects of this disclosure.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

While various instances have been described herein, it should be apparent, however, that various modifications, alterations and adaptations to those instances may occur to persons skilled in the art with the attainment of some or all of the advantages of the invention. The disclosed instances are therefore intended to include all such modifications, alterations and adaptations without departing from the scope and spirit of the invention. Accordingly, other instances and implementations are within the scope of the following claims. For example, the actions recited in the claims can be performed in a different order and still achieve desirable results.

What is claimed is:

1. An apparatus for viewing a stereoscopic image, the apparatus comprising:
   a headset comprising a display and a housing, the housing comprising a first lens configured to be positioned substantially over a first eye of a user of the headset and a second lens configured to be positioned substantially over a second eye of the user of the headset;
   wherein the first lens and the second lens respectively comprise a central portion and a peripheral portion surrounding at least part of the central portion, the central portion comprising an aspheric lens and the peripheral portion comprising a Fresnel lens, and
   wherein:
      the central portion comprises a peripheral portion-receiving cavity, the peripheral portion-receiving cavity defining a part of the central portion configured to receive the peripheral portion, or
      the peripheral portion comprises a central portion-receiving cavity, the central portion-receiving cavity defining a part of the peripheral portion configured to receive the central portion.

2. The apparatus of claim 1, wherein the display is a curved display, and wherein the first lens and the second lens are configured to project onto the curved display.

3. The apparatus of claim 2, wherein a curvature of the curved display varies.

4. The apparatus of claim 1, wherein the Fresnel lens is formed from a stack of one or more Fresnel elements.

5. The apparatus of claim 1, wherein the Fresnel lens has a curvature configured to provide an increased peripheral field of view on opposed lateral sides of the headset and to conform to a shape of a head of the user of the headset.

6. The apparatus of claim 1, wherein the Fresnel lens and the aspheric lens are unitary.

7. The apparatus of claim 1, wherein the aspheric lens is positioned substantially in a center of the Fresnel lens.

8. The apparatus of claim 1, wherein the aspheric lens is positioned offset from a center of the Fresnel lens such that the aspheric lens of the first lens and the aspheric lens of the second lens are located closer to a midline of headset.

9. The apparatus of claim 1, wherein a position of the central portion and a position of the peripheral portion in the first lens mirrors a position of the central portion and a position of the peripheral portion in the second lens.

10. The apparatus of claim 1, wherein the aspheric lens includes an antireflective coating.

11. A lens assembly, comprising:
a central lens portion comprising an aspheric lens; and
a peripheral lens portion comprising a Fresnel lens,
wherein the peripheral lens portion surrounds at least part of the central lens portion,
wherein the peripheral lens portion comprises a central portion-receiving cavity defining a part of the peripheral lens portion configured to receive the central lens portion, or
wherein the central lens portion comprises a peripheral portion-receiving cavity, the peripheral portion-receiving cavity defining a part of the central lens portion configured to receive the peripheral lens portion.

12. The lens assembly of claim 11, wherein the Fresnel lens has a curvature that provides an increased peripheral field of view relative to a lateral side of the lens assembly.

13. The lens assembly of claim 11, wherein the central portion-receiving cavity defined by the peripheral lens portion is positioned substantially in a center of the peripheral lens portion such that the central lens portion is positioned substantially in the center of the peripheral lens portion.

14. The lens assembly of claim 11, wherein the central portion-receiving cavity defined by the peripheral lens portion is positioned offset from a center of the peripheral lens portion such that the central lens portion is positioned substantially offset from the center of the peripheral lens portion.

15. The lens assembly of claim 11, wherein the Fresnel lens comprises an optically transmissive material, the optically transmissive material comprising a first Fresnel surface, wherein the first Fresnel surface defines a plurality of grooves.

16. The lens assembly of claim 15, wherein the plurality of grooves respectively have a cross-sectional profile that includes at least one of a triangular profile, an arcuate profile, or a saw tooth profile.

17. The apparatus of claim 1, wherein the central portion comprising the aspheric lens is attached to the peripheral portion comprising the Fresnel lens using an optical glue.

18. The apparatus of claim 1, wherein a center of the central portion is offset from a center of the peripheral portion.

19. The lens assembly of claim 15, wherein the plurality of grooves comprise a constant groove depth profile.

20. The lens assembly of claim 15, wherein the plurality of grooves comprise a groove depth profile that varies from a center of the Fresnel lens to a periphery of the Fresnel lens.

* * * * *